US010330040B2

(12) United States Patent
Surnilla et al.

(10) Patent No.: US 10,330,040 B2
(45) Date of Patent: Jun. 25, 2019

(54) METHOD AND SYSTEM FOR AIR-FUEL RATIO CONTROL

(71) Applicant: Ford Global Technologies, LLC, Dearborn, MI (US)

(72) Inventors: Gopichandra Surnilla, West Bloomfield, MI (US); Imad Hassan Makki, Dearborn Heights, MI (US); Adithya Pravarun Re Ranga, Canton, MI (US); Hassene Jammoussi, Canton, MI (US); Robert Roy Jentz, Westland, MI (US); Michael Igor Kluzner, West Bloomfield, MI (US); Stephen B. Smith, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 369 days.

(21) Appl. No.: 15/182,491

(22) Filed: Jun. 14, 2016

(65) Prior Publication Data

US 2017/0356380 A1    Dec. 14, 2017

(51) Int. Cl.
*F02D 13/02*  (2006.01)
*F02D 13/06*  (2006.01)
(Continued)

(52) U.S. Cl.
CPC ......... *F02D 41/2454* (2013.01); *F02D 13/06* (2013.01); *F02D 17/02* (2013.01);
(Continued)

(58) Field of Classification Search
CPC .. F02D 41/2454; F02D 41/3076; F02D 17/02; F02D 41/0087; F02D 41/0085;
(Continued)

(56) References Cited

U.S. PATENT DOCUMENTS

| 5,181,496 A | * | 1/1993 | Kojima | F02D 41/12 123/493 |
| 5,651,353 A | * | 7/1997 | Allston | F02D 41/0085 123/673 |

(Continued)

FOREIGN PATENT DOCUMENTS

| JP | 09195864 A | * | 7/1997 | ........... F02D 41/004 |
| JP | 2003083140 A | * | 3/2003 | |

(Continued)

OTHER PUBLICATIONS

Jammoussi, Hassene et al., "Method and System for Determining Air-Fuel Ratio Imbalance," U.S. Appl. No. 14/641,073, filed Mar. 6, 2015, 64 pages.
(Continued)

*Primary Examiner* — Sizo B Vilakazi
*Assistant Examiner* — Brian R Kirby
(74) *Attorney, Agent, or Firm* — Julia Voutyras; McCoy Russell LLP

(57) ABSTRACT

Methods and systems are provided for learning fuel injector error for cylinder groups during a deceleration fuel shut-off (DFSO), where all cylinders of an engine are deactivated, sequentially firing each cylinder of a cylinder group, each cylinder fueled via consecutive first and second fuel pulses of differing fuel pulse width from an injector. Based on a lambda deviation between the first and second pulses, a fuel error for the injector and an air-fuel ratio imbalance for each cylinder is learned. Alternatively or additionally, a difference in crankshaft acceleration between the first and second pulses relative to the expected deviation may be used to learn torque error, and adjust fuel injector error and air-ratio imbalance for each cylinder.

20 Claims, 12 Drawing Sheets

(51) Int. Cl.
*F02D 17/02* (2006.01)
*F02D 41/00* (2006.01)
*F02D 41/12* (2006.01)
*F02D 41/14* (2006.01)
*F02D 41/24* (2006.01)
*F02D 41/30* (2006.01)
*F02D 41/40* (2006.01)
*F02M 65/00* (2006.01)

(52) U.S. Cl.
CPC ..... *F02D 41/0085* (2013.01); *F02D 41/0087* (2013.01); *F02D 41/123* (2013.01); *F02D 41/1497* (2013.01); *F02D 41/2467* (2013.01); *F02D 41/3076* (2013.01); *F02D 41/3094* (2013.01); *F02D 41/402* (2013.01); *F02M 65/00* (2013.01); *F02D 13/0207* (2013.01); *F02D 41/1454* (2013.01); *F02D 2200/1012* (2013.01); *F02M 65/001* (2013.01); *Y02T 10/18* (2013.01); *Y02T 10/44* (2013.01)

(58) Field of Classification Search
CPC ............. F02D 41/1497; F02D 13/0207; F02D 41/1454; F02D 2200/1012; F02M 65/00; F02M 65/001; Y02T 10/44; Y02T 10/18
USPC .................. 123/436; 701/102–104, 109–110
See application file for complete search history.

(56) References Cited

U.S. PATENT DOCUMENTS

| | | | | |
|---|---|---|---|---|
| 5,979,413 A * | 11/1999 | Ohnuma | ............... | F02D 41/009 123/406.58 |
| 6,102,018 A | 8/2000 | Kerns et al. | | |
| 6,244,241 B1 * | 6/2001 | Mamiya | ............... | F02D 41/2461 123/295 |
| 6,314,952 B1 * | 11/2001 | Turin | .................. | F02D 41/0085 123/673 |
| 6,324,836 B1 | 12/2001 | Nakagawa et al. | | |
| 6,550,466 B1 | 4/2003 | Behr et al. | | |
| 6,694,960 B2 * | 2/2004 | Hess | ..................... | F02D 35/023 123/436 |
| 6,990,950 B2 * | 1/2006 | Asano | ................. | F02D 41/2438 123/299 |
| 7,000,379 B2 | 2/2006 | Makki et al. | | |
| 7,027,910 B1 * | 4/2006 | Javaherian | .......... | F02D 41/0085 123/406.24 |
| 7,497,210 B2 * | 3/2009 | Okamoto | ................ | F02D 13/06 123/673 |
| 7,715,974 B2 * | 5/2010 | Gibson | ..................... | F01L 9/04 123/406.47 |
| 7,801,666 B2 * | 9/2010 | Mitsuda | .................. | F02D 13/06 123/674 |
| 7,802,563 B2 | 9/2010 | Behr et al. | | |
| 7,881,857 B2 * | 2/2011 | Samenfink | .......... | F02D 41/1454 123/299 |
| 7,885,753 B2 * | 2/2011 | Achleitner | ............ | F02D 41/008 701/103 |
| 7,891,337 B2 * | 2/2011 | Takeuchi | .......... | F02D 41/1497 123/436 |
| 7,921,707 B2 * | 4/2011 | Ishizuka | ............. | F02D 41/0072 73/114.15 |
| 8,010,277 B2 * | 8/2011 | Ishizuka | ............... | F02D 41/123 123/198 DB |
| 8,261,727 B2 | 9/2012 | Bagnasco et al. | | |
| 8,302,581 B2 | 11/2012 | Nishikiori et al. | | |
| 8,306,723 B2 * | 11/2012 | Haskara | ................. | F02D 35/023 123/435 |
| 8,489,361 B2 * | 7/2013 | Umehara | ............. | F02D 41/123 702/183 |
| 8,862,367 B2 * | 10/2014 | Toyohara | ............. | F02D 41/247 123/478 |
| 2002/0148441 A1 * | 10/2002 | Tuken | ................. | F02D 41/0085 123/436 |
| 2004/0006973 A1 | 1/2004 | Makki et al. | | |
| 2004/0267433 A1 * | 12/2004 | Asano | .................... | F02D 41/123 701/104 |
| 2005/0120706 A1 * | 6/2005 | Yoshioka | ................. | F01N 3/101 60/277 |
| 2007/0051342 A1 * | 3/2007 | Kita | .................... | F02D 41/0097 123/436 |
| 2007/0062489 A1 * | 3/2007 | Miyata | .................. | F01N 3/0814 123/406.47 |
| 2007/0240695 A1 * | 10/2007 | Mitsuda | .................. | F02D 13/06 123/673 |
| 2007/0251507 A1 * | 11/2007 | Mueller | .................. | F02D 41/12 123/493 |
| 2008/0243362 A1 * | 10/2008 | Mitsuda | ................. | F02D 13/06 701/103 |
| 2009/0037079 A1 * | 2/2009 | Suzuki | .................. | F02D 41/008 701/103 |
| 2009/0063018 A1 * | 3/2009 | Takeuchi | ............ | F02D 41/1497 701/104 |
| 2011/0113756 A1 * | 5/2011 | Yezerets | ................. | F01N 3/103 60/276 |
| 2011/0125389 A1 * | 5/2011 | De Fazio | .............. | F02D 41/123 701/103 |
| 2011/0213544 A1 * | 9/2011 | Mitsuda | ............... | F02D 41/2441 701/103 |
| 2011/0259094 A1 * | 10/2011 | Zeidler | .................. | F02D 41/221 73/114.77 |
| 2011/0276250 A1 * | 11/2011 | Sano | ....................... | F02D 13/06 701/103 |
| 2012/0053820 A1 * | 3/2012 | Nishikiori | ........... | F02D 41/0082 701/103 |
| 2012/0185156 A1 * | 7/2012 | Iwazaki | .............. | F02D 41/0042 701/104 |
| 2012/0247422 A1 * | 10/2012 | Nagakura | ........... | F02D 41/1454 123/299 |
| 2013/0179051 A1 * | 7/2013 | Tomimatsu | ............. | F02D 17/02 701/104 |
| 2013/0184969 A1 * | 7/2013 | Rollinger | ............. | F02D 41/22 701/103 |
| 2013/0231844 A1 * | 9/2013 | Uhrich | .................. | F01N 11/007 701/104 |
| 2014/0000556 A1 * | 1/2014 | Nakamura | ............... | F02D 41/30 123/325 |
| 2014/0067235 A1 * | 3/2014 | Banker | .................. | F01N 11/007 701/104 |
| 2014/0277998 A1 | 9/2014 | Martin et al. | | |
| 2014/0290622 A1 | 10/2014 | Ikeda et al. | | |
| 2014/0366846 A1 * | 12/2014 | Ikemoto | ................ | F02D 41/247 123/472 |
| 2016/0018291 A1 | 1/2016 | Uhrich et al. | | |
| 2016/0053732 A1 * | 2/2016 | Ikemoto | ................ | F02D 41/221 239/71 |
| 2016/0131064 A1 * | 5/2016 | Hayashita | ........... | F02D 41/1495 73/1.06 |

FOREIGN PATENT DOCUMENTS

| | | | | |
|---|---|---|---|---|
| JP | 2009024531 A | * | 2/2009 | |
| JP | 2009115068 A | * | 5/2009 | |
| JP | 2009264115 A | * | 11/2009 | |
| JP | 2013024199 A | * | 2/2013 | ............ F02D 41/12 |
| JP | 2013024199 A | * | 2/2013 | |

OTHER PUBLICATIONS

Jammoussi, Hassene et al., "Method and System for Determining Air-Fuel Ratio Imbalance," U.S. Appl. No. 14/641,124, filed Mar. 6, 2015, 66 pages.

Jammoussi, Hassene et al., "Method and System for Determining Air-Fuel Ratio Imbalance Via Engine Torque," U.S. Appl. No. 14/712,202, filed May 14, 2015, 57 pages.

(56) References Cited

OTHER PUBLICATIONS

Jammoussi, Hassene et al., "Method and System for Determining Air-Fuel Ratio Imbalance," U.S. Appl. No. 15/182,518, filed Jun. 14, 2016, 75 pages.

* cited by examiner

METHOD AND SYSTEM FOR AIR-FUEL RATIO CONTROL

FIELD

The present description relates generally to methods and systems for controlling a vehicle engine to monitor the imbalance in air-fuel ratio under decelerated fuel shut-off conditions (DFSO).

BACKGROUND/SUMMARY

Engine parameters such as air-fuel ratio (AFR) can be controlled to ensure improved engine performance leading to effective use of an exhaust catalyst and reduced exhaust emissions. In particular, if engine exhaust gases are not rich or lean as expected due to engine air-fuel ratio variation between an engine's cylinders, engine emissions may degrade. In addition, there may be torque imbalance between the engine cylinders which can result in NVH issues.

One way to determine air-fuel ratio variation between engine cylinders is to sense engine exhaust gases via an oxygen sensor. Additionally or optionally crankshaft acceleration may be estimated at a desired AFR. Fuel and/or charge air parameters may then be adjusted based on the variation to produce an air-fuel mixture at a target air-fuel ratio. However, the oxygen sensor may be exposed to exhaust gases that are a combination of gases from different engine cylinders. Therefore, it may be difficult to accurately determine air-fuel variations between different engine cylinders. Further, engine exhaust system geometry for cylinders having a large number of cylinders may bias sensor readings toward output of one cylinder more than other cylinders. Consequently, it may be even more difficult to determine air-fuel imbalance for engines having more than a few cylinders.

Furthermore, in dual fuel injection systems where the engine is configured with hardware for each of direct injection and port fuel injection (PFDI systems), it may be difficult to differentiate between DI and PFI induced air-fuel ratio imbalance. This is due to both injectors being active during the monitoring. In addition, purging of fuel vapors and use of positive crankcase ventilation (PCV) can further corrupt oxygen sensor outputs when scheduling a fuel pulse through an injector, requiring complicated calculations to compensate for the ingested hydrocarbons. If the AFR monitoring is scheduled during conditions when purge or PCV is disabled, there may be limited opportunities for AFR monitoring. On the other hand, if purge is disabled to complete AFR monitoring, a fuel vapor canister may not be effectively cleaned, leading to emissions issues.

The inventors herein have recognized the shortcomings discussed above and have developed a method for determining air-fuel ratio imbalance and injector error in engine cylinders taking into account AFR variations among cylinder groups. In one example, AFR imbalance may be determined by a method for an engine, comprising: during a deceleration fuel shut-off (DFSO) event where all cylinders of an engine are deactivated, sequentially firing each cylinder of a cylinder group, each cylinder fueled via consecutive first and second fuel pulses of differing fuel pulse width from an injector; and based on a lambda deviation between the first and second pulses, learning a fuel error for the injector and an air-fuel ratio imbalance for each cylinder.

In this way, AFR monitoring may be performed independent of purge or PCV hydrocarbons, and while better differentiating errors from distinct injectors.

In one example, AFR errors may be learned during deceleration fuel shut-off conditions (DFSO), a period characterized by lower driver demand torque where the engine is in motion, and spark and fuel supply to one or more cylinders is cut-off. During the DFSO conditions, a cylinder group may be sequentially fired, with at least two consecutive fuel pulses of different pulse widths delivered to each cylinder. A change in AFR corresponding to each pulse width may be learned. An air-fuel ratio imbalance for the injector of the given cylinder group is then determined based on a deviation from a maximum lean air-fuel ratio measured under DFSO conditions. In particular, an engine controller may learn a first change in AFR following the first fuel pulse relative to a second change in AFR following the second fuel pulse. This may be compared to a pulse width of the first fuel pulse relative to the pulse width of the second fuel pulse to determine the injector error. Alternatively the injector error following each pulse may be determined based on a change in crankshaft acceleration following each fuel pulse. Assuming that the quantity of air charge and excess fuel vapors purged to the engine intake during the monitoring remain constant, errors due to the ingestion of purge or PCV hydrocarbons are not introduced.

The approach described here may confer several advantages. For example, the method provides improved capability for learning air-fuel ratio imbalance and allows better detection of injector error among cylinder groups. Consequently, the approach ensures improved fuel efficiency and reduced emissions. In addition, the method automatically compensates for air-fuel ratio imbalance associated with purge and PCV. By rendering the learning independent of the presence of purge or PCV fuel vapors, injector learning can be performed over a wider range of engine operating conditions, and without compromising canister purge efficiency. The technical effect of learning air-fuel ratio imbalance and injector error among cylinder groups is AFR errors may better learned, improving exhaust emissions and engine performance.

The above discussion includes recognitions made by the inventors and not admitted to be generally known. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
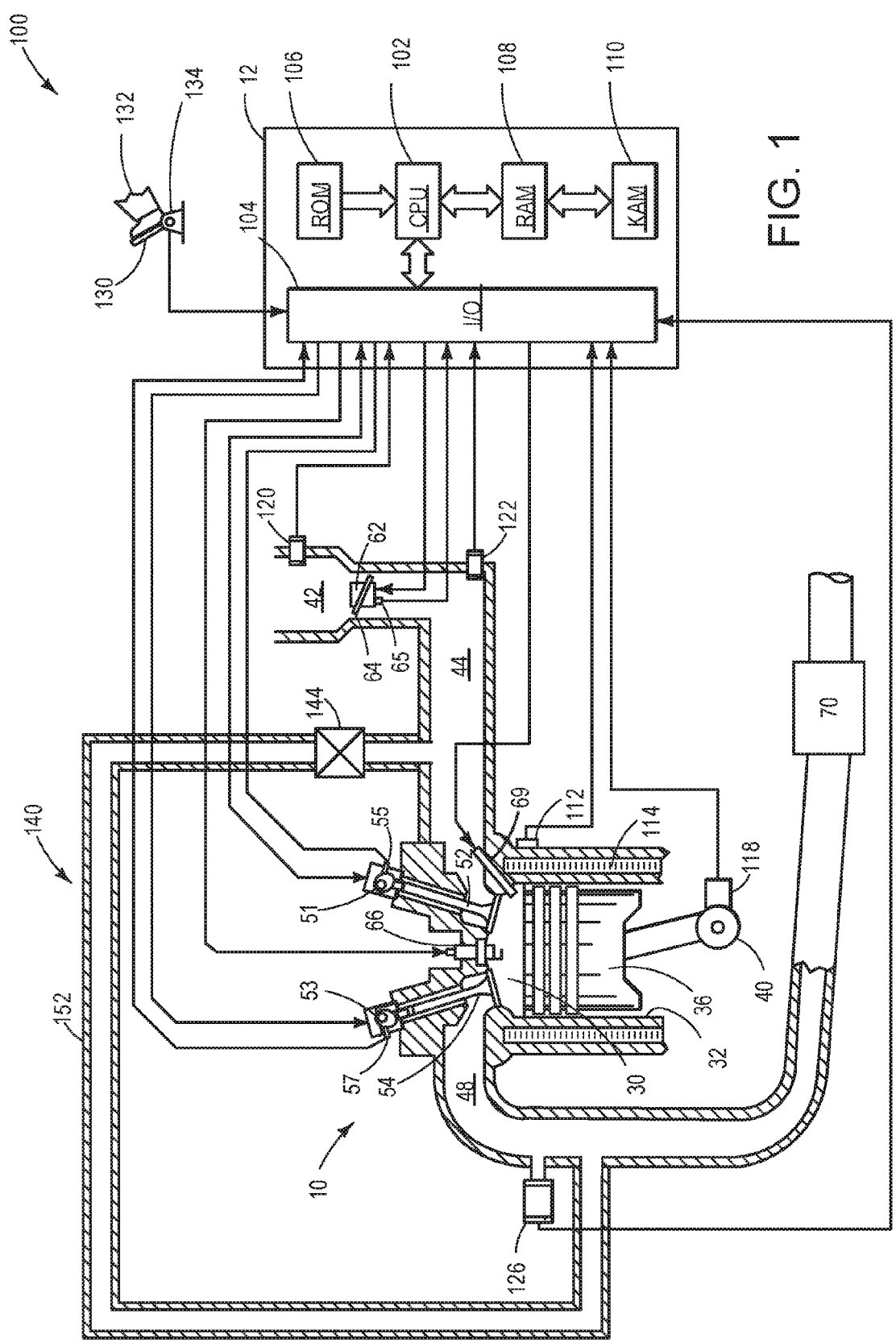
FIG. 1 is an illustration of an engine with a cylinder.
Figure 2:
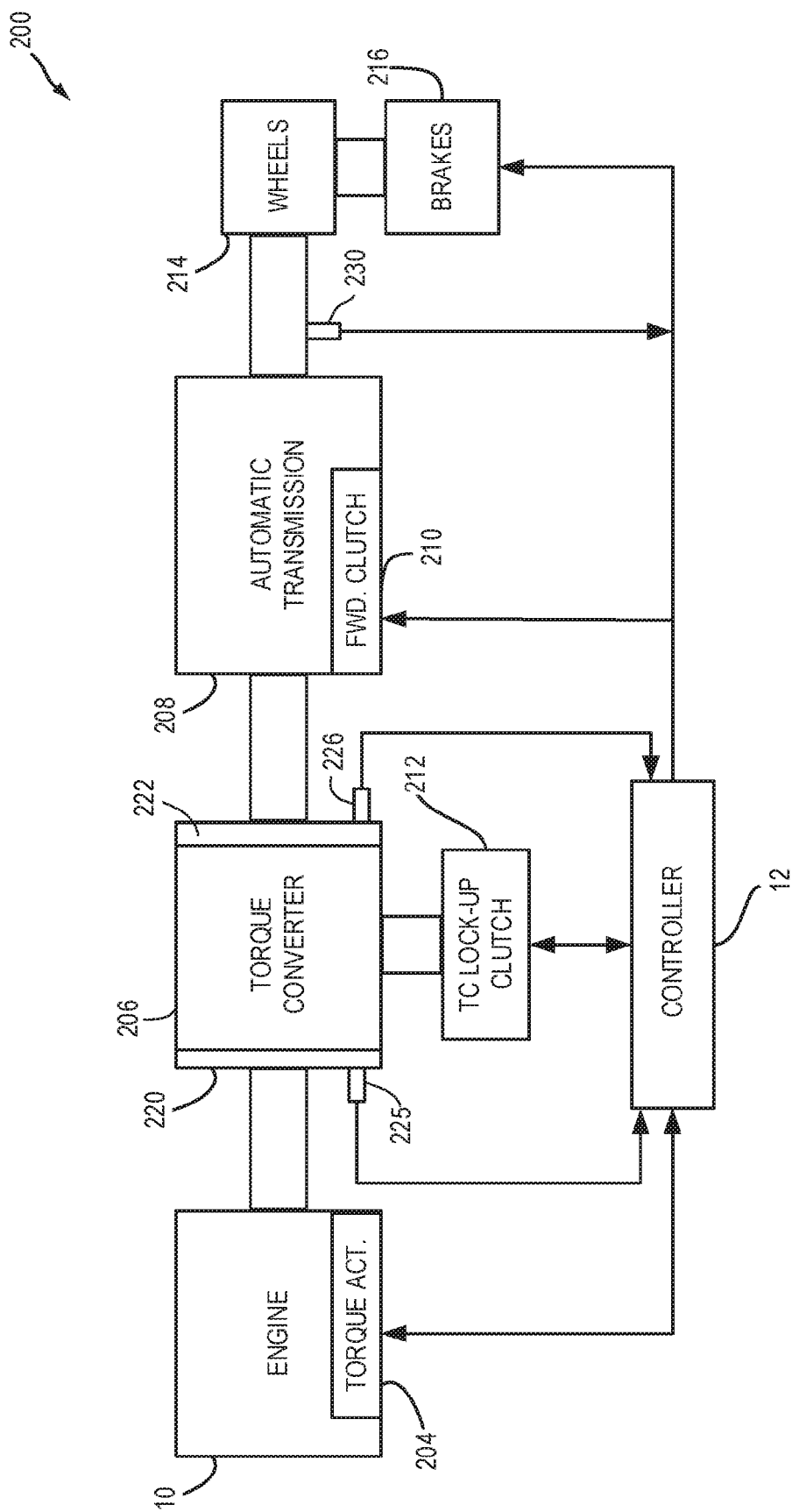
FIG. 2 is an illustration of components of a driveline including engine and transmission.
Figure 3:
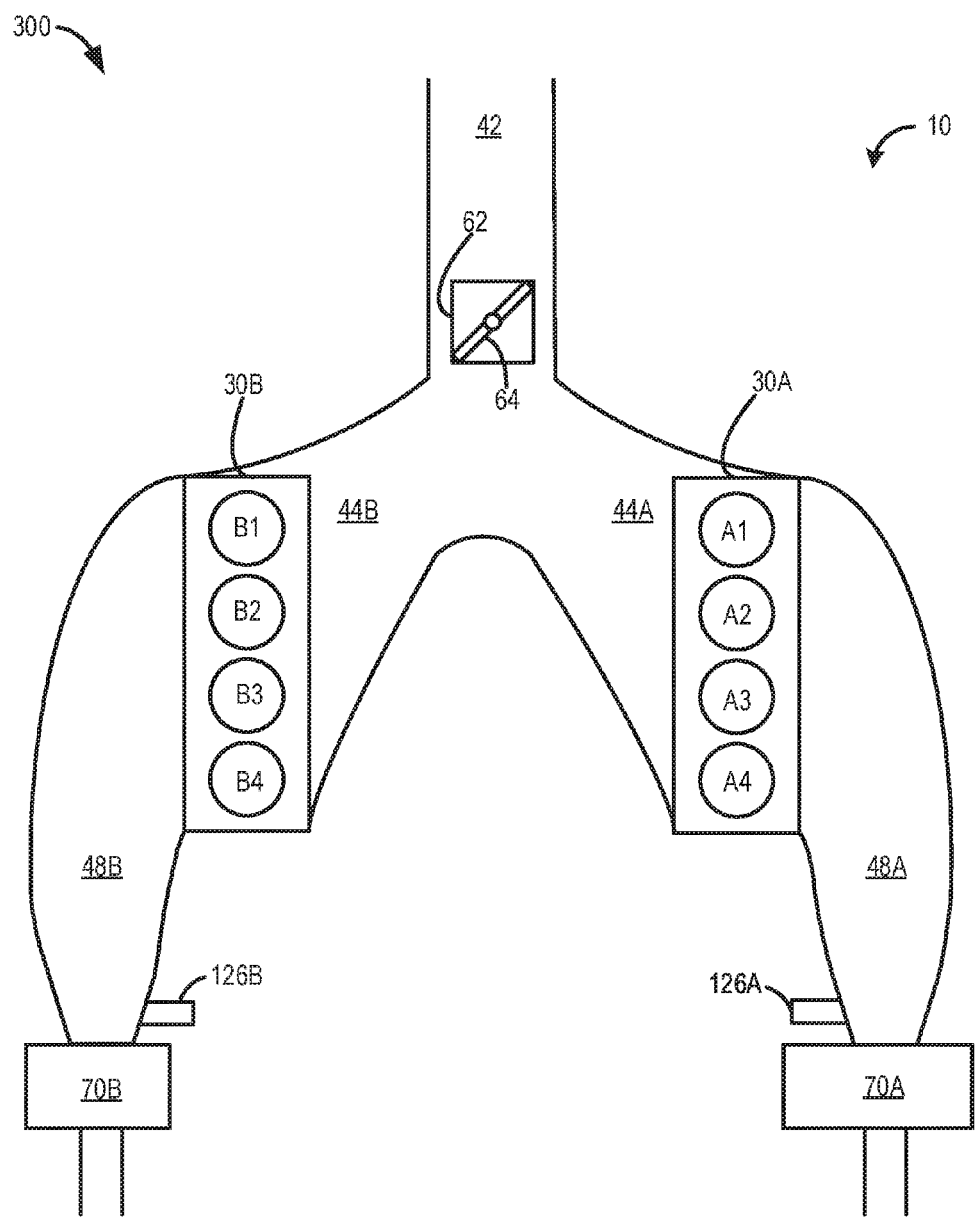
FIG. 3 is an illustration of a typical V-8 engine with two cylinder banks.
Figure 4:
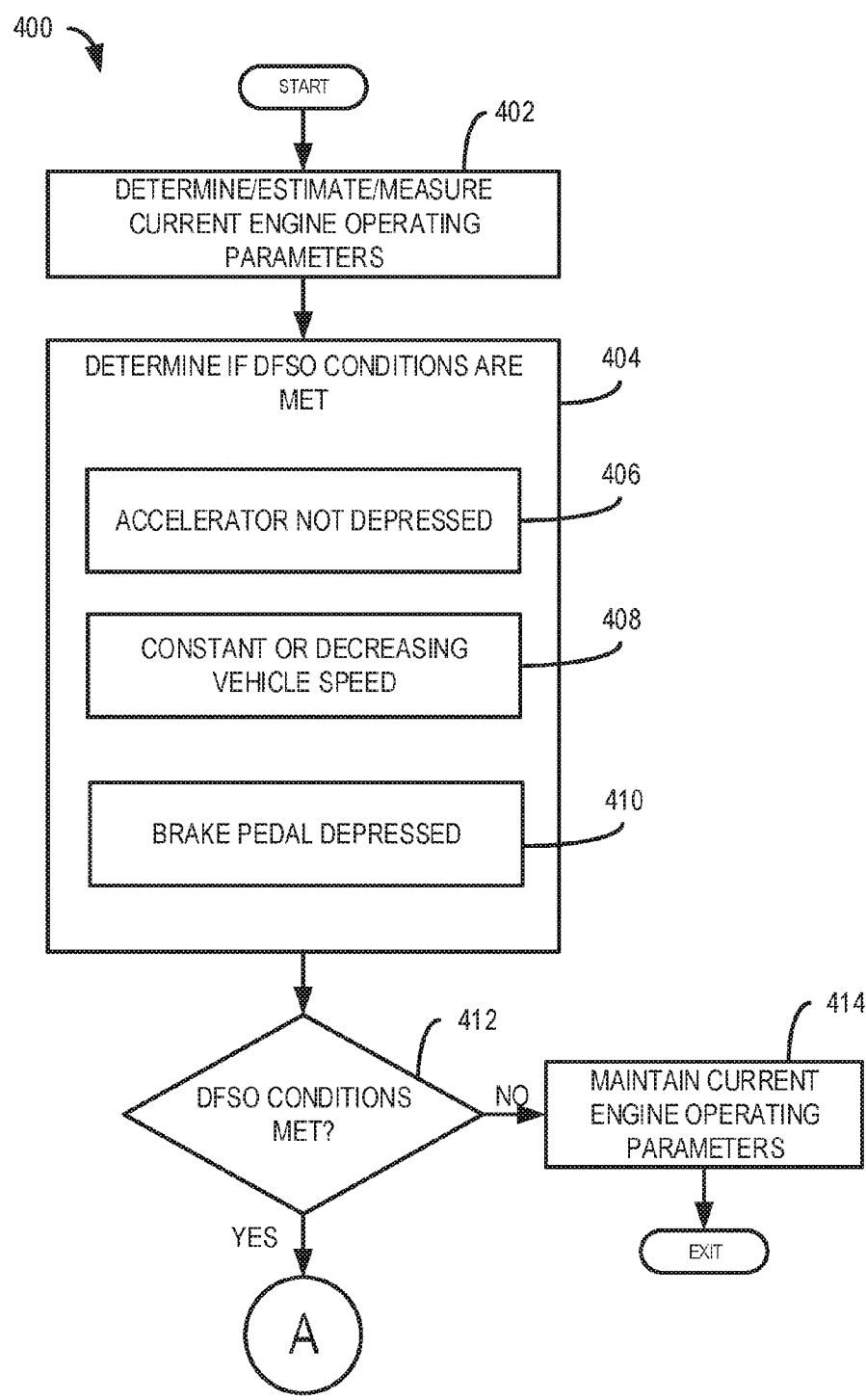
FIG. 4 is a schematic showing how DFSO conditions are determined.
Figure 5:
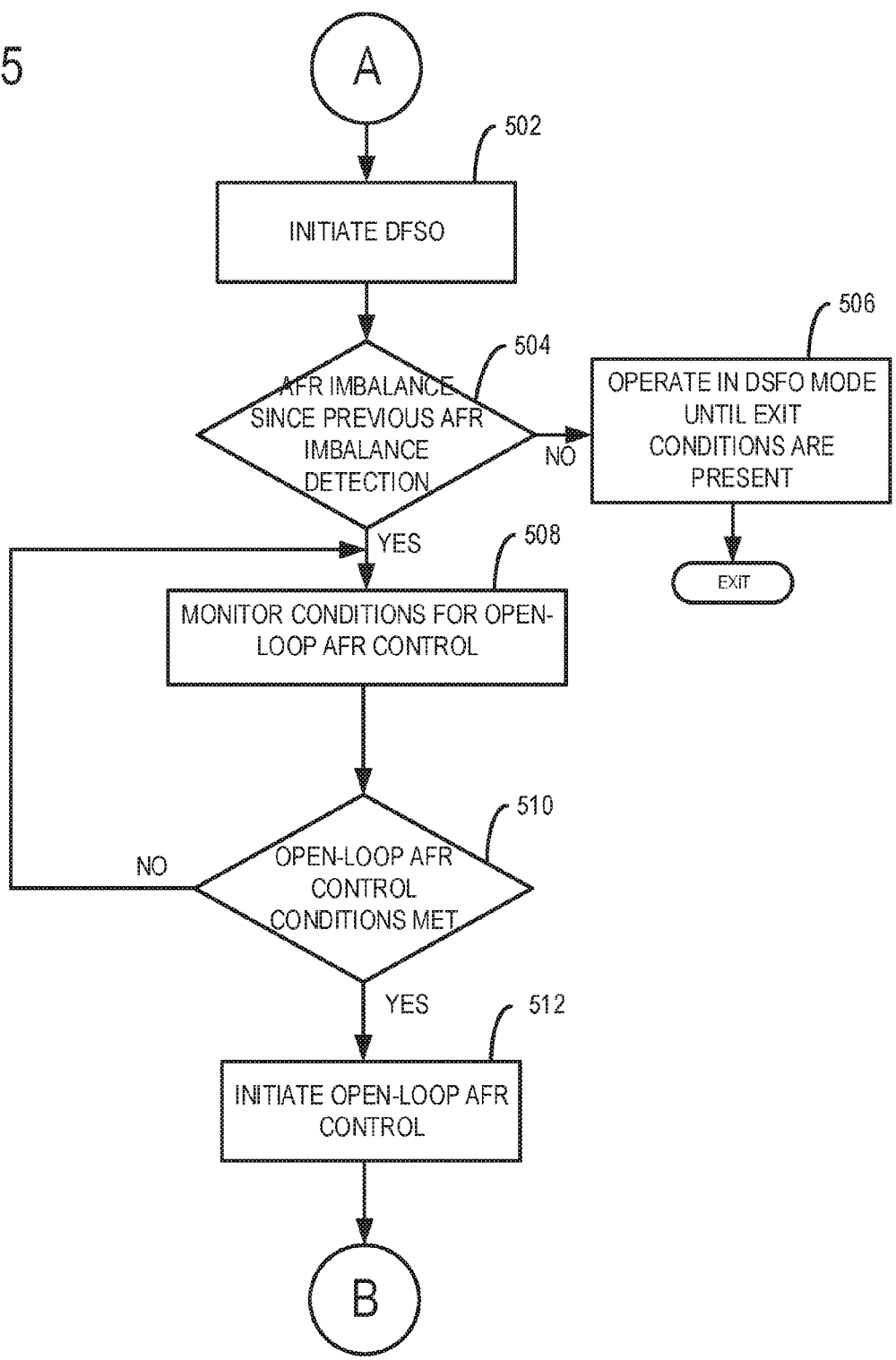
FIG. 5 is a schematic showing an example approach for determining conditions and initiation of open-loop air fuel ratio control.
Figure 6:
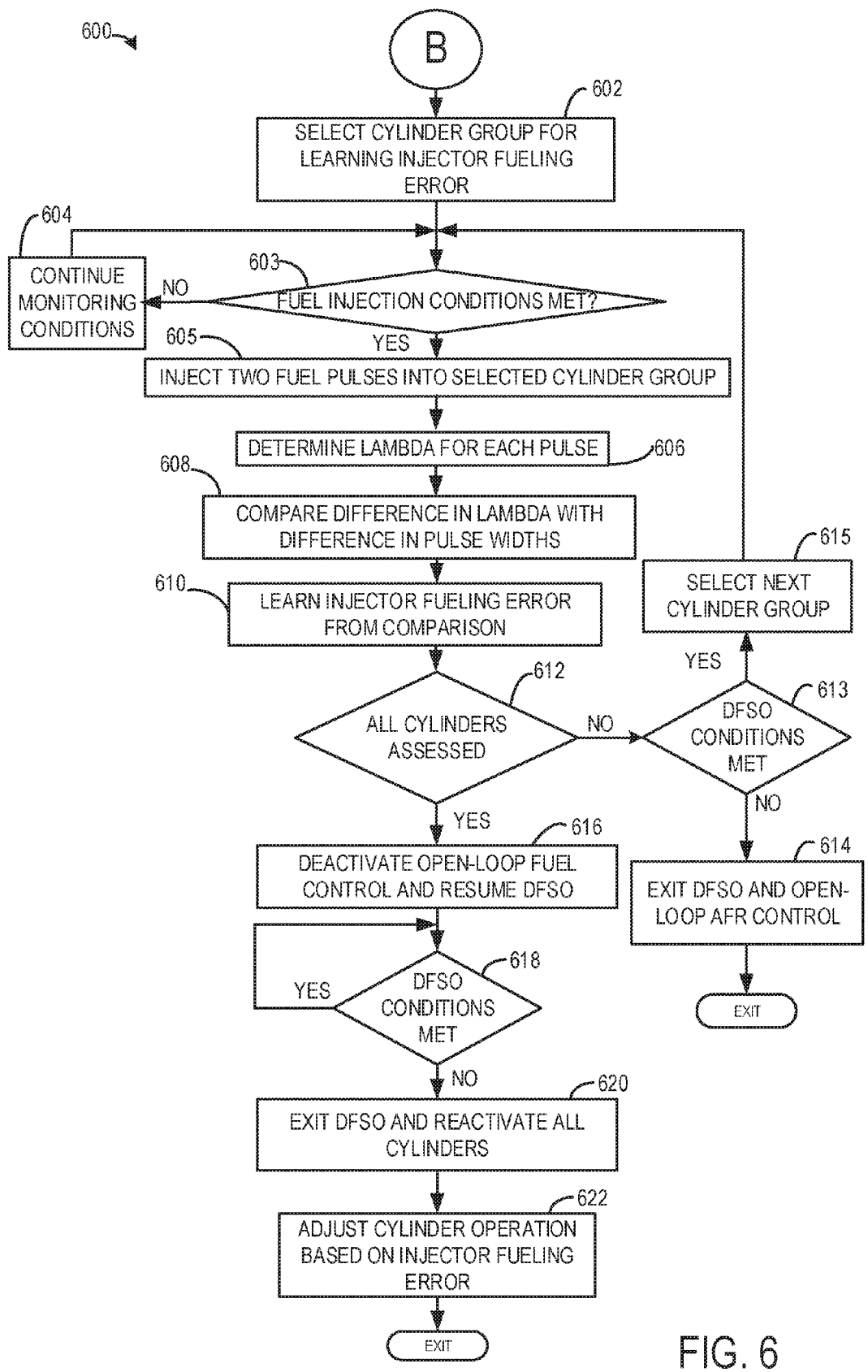
FIG. 6 is a schematic showing an example approach for firing select cylinder groups during open-loop air-fuel ratio control for lambda based cylinder to cylinder air-fuel variation learning and fuel injector error correction.
Figure 7:
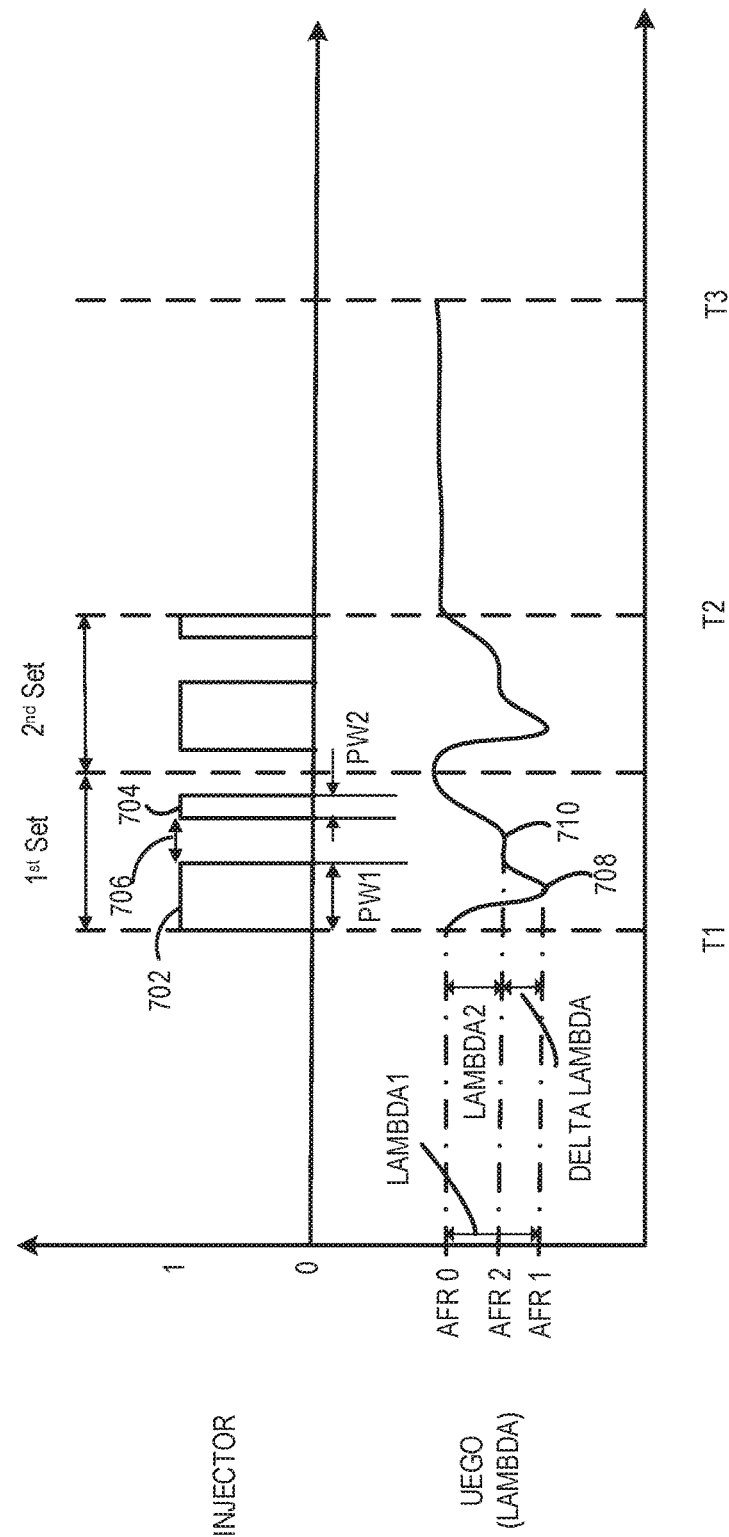
FIG. 7 shows sets of two consecutive fuel pulses of different pulse width injected into a cylinder and sample graphical data measured during open-loop air-fuel ratio control for lambda based cylinder to cylinder air-fuel variation learning.
Figure 8:
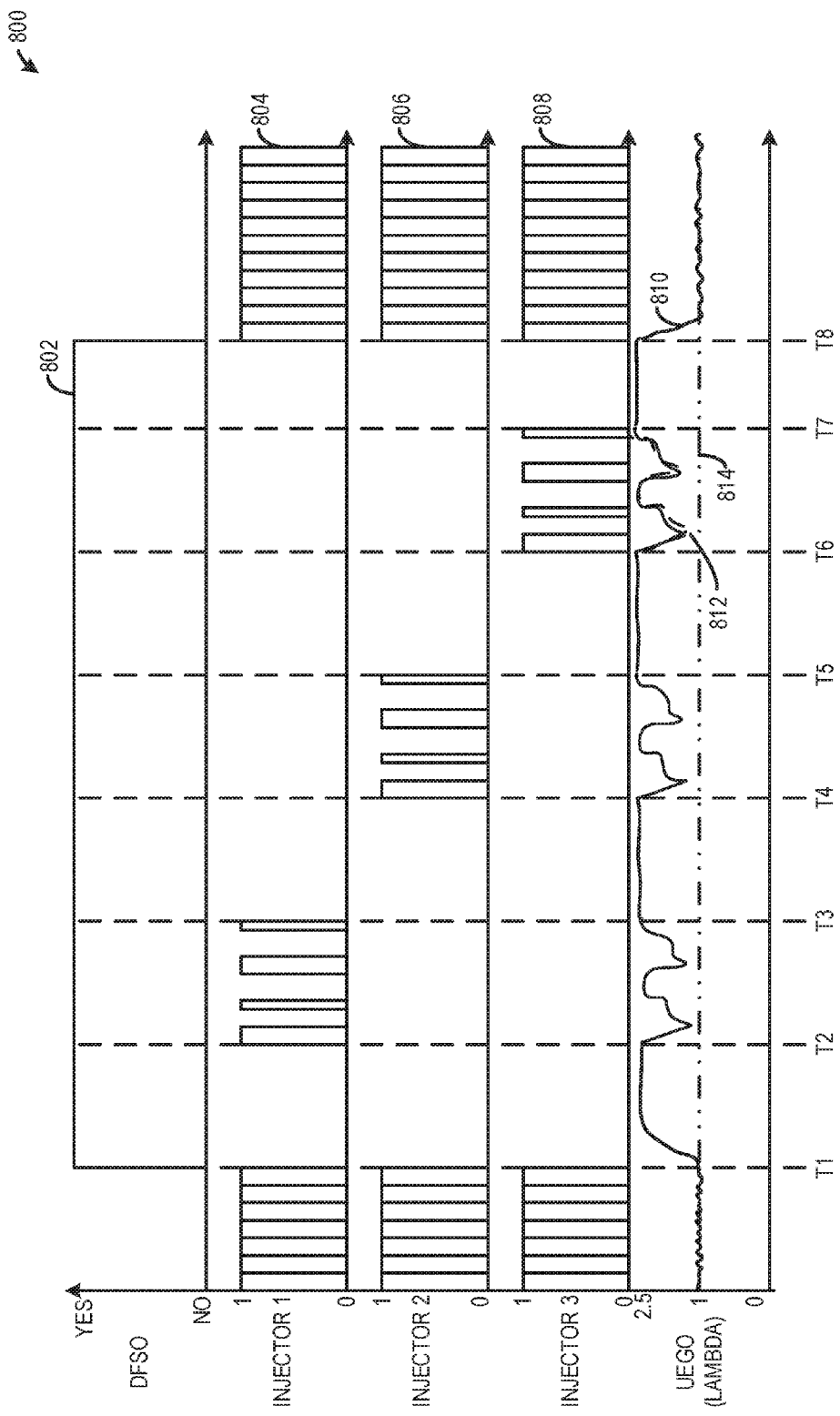
FIG. 8 illustrates sample graphical data measured during open-loop air-fuel ratio control for lambda based cylinder to cylinder air-fuel variation learning.
Figure 9:
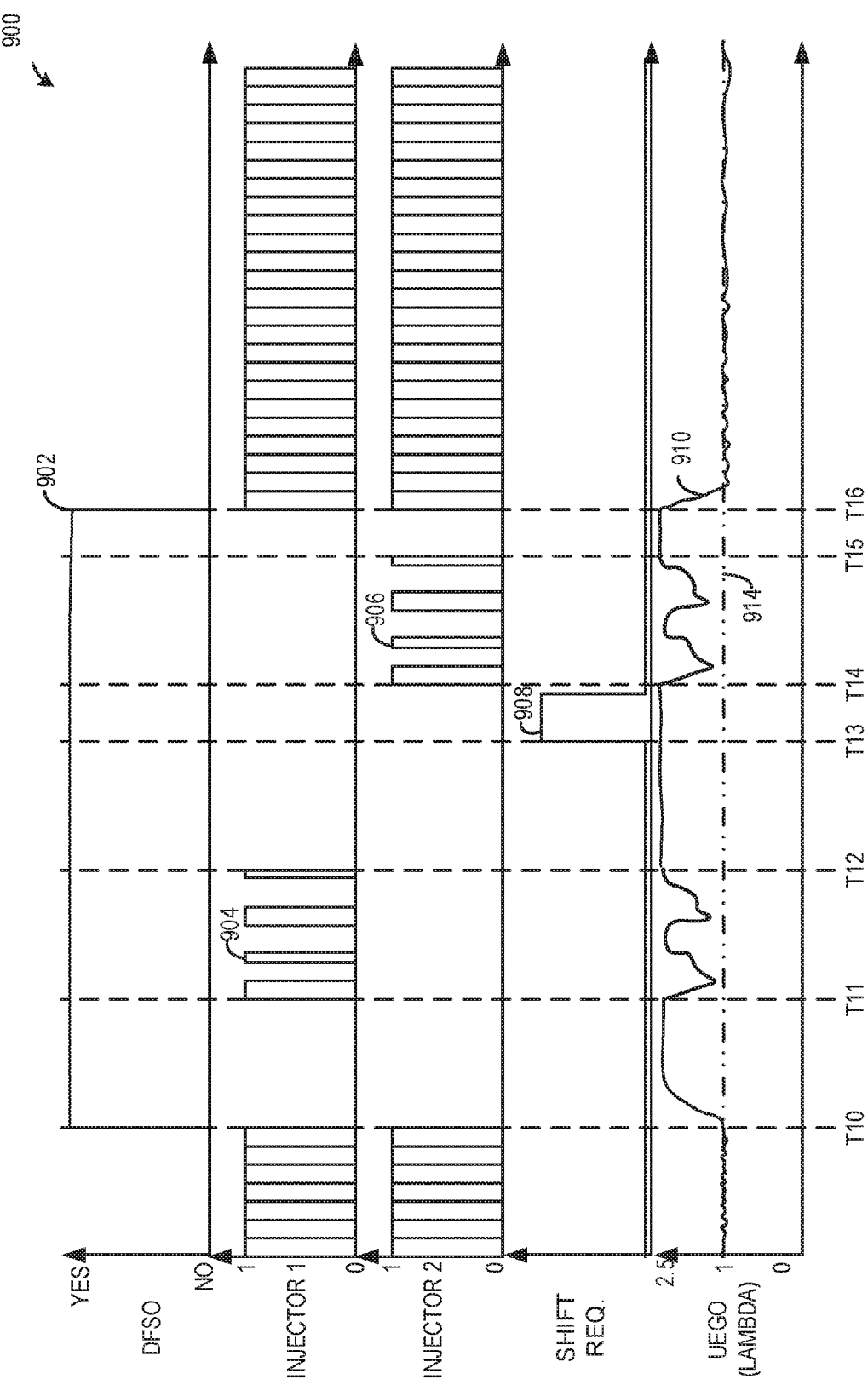
FIG. 9 is a plot of an example DFSO sequence where cylinder lambda variation analysis is delayed in response to a transmission shift request.
Figure 10:
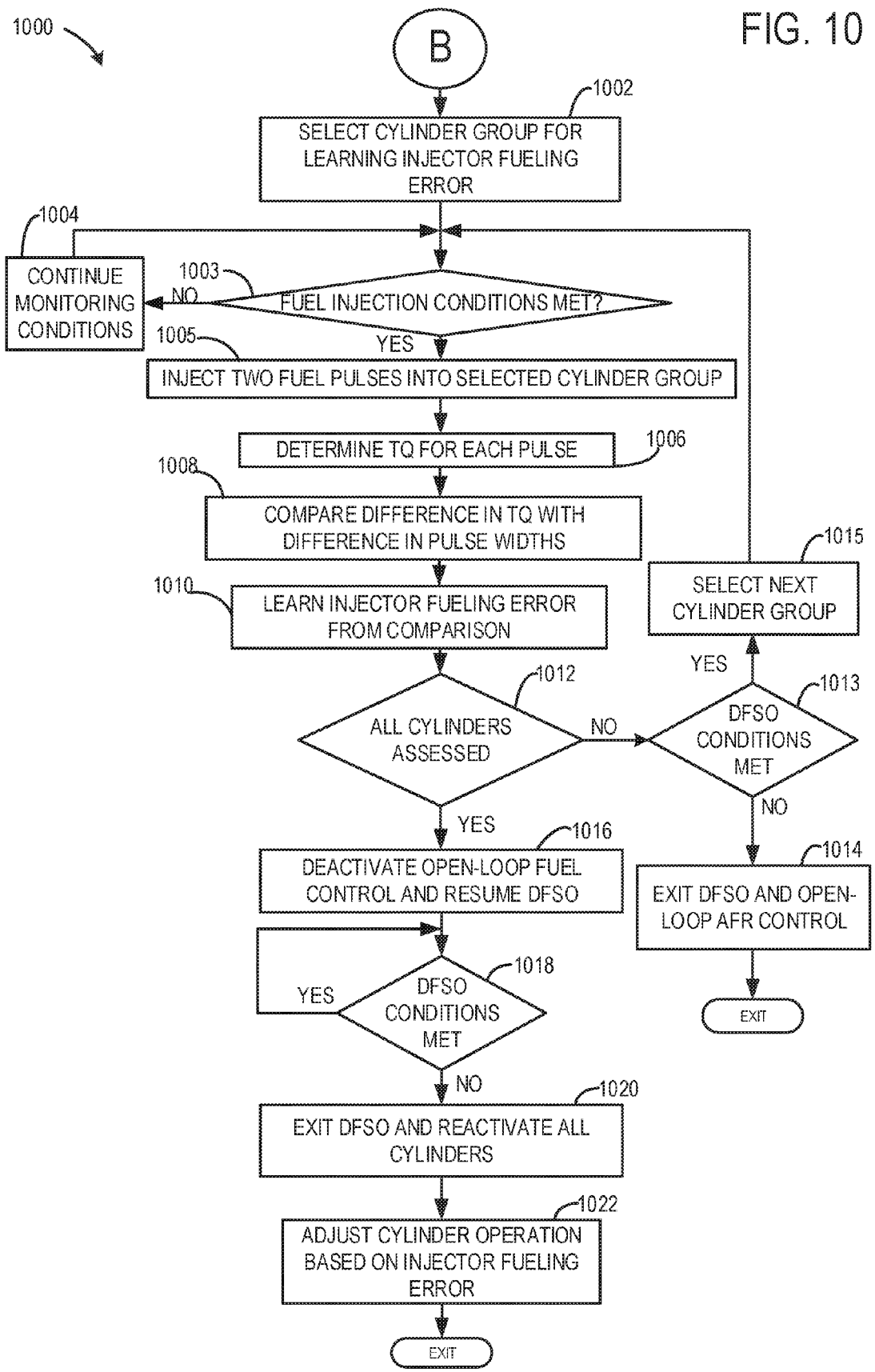
FIG. 10 is a schematic showing an example approach for firing select cylinder groups during open-loop air-fuel ratio control for crankshaft acceleration based cylinder to cylinder air-fuel variation learning and fuel injector error correction.

The following description relates to systems and methods for detecting and correcting an air-fuel ratio imbalance and injector error during DFSO. FIG. 1 illustrates a single cylinder of an engine comprising an exhaust gas sensor upstream of an emission control device. FIG. 2 depicts an engine, transmission, and other vehicle components. FIG. 3 shows a sample V-8 engine with a pair of cylinder banks, exhaust manifolds, and exhaust gas sensors. FIG. 4 shows a method for determining conditions for DFSO. FIG. 5 illustrates a method for initiating open-loop air-fuel ratio control during DFSO. FIG. 6 illustrates an exemplary method for carrying out the open-loop air-fuel ratio control based on cylinder to cylinder air-fuel ratio correction. FIG. 7 illustrates an exemplary method for carrying out the open-loop air-fuel ratio control and crankshaft acceleration based cylinder to cylinder air-fuel ratio correction. FIG. 8 shows a plot of various signals of interest during open-loop air-fuel ratio control while determining the presence or absence of cylinder to cylinder air-fuel variation based on lambda analysis. FIG. 9 is a plot of an example DFSO sequence where cylinder lambda variation analysis is delayed in response to a transmission shift request. FIG. 10 shows vehicle operating conditions for determining whether or not to inject fuel to selected deactivated cylinders for the purpose of determining and correcting cylinder to cylinder air-fuel variation based on either lambda analysis or crankshaft acceleration.

Referring now to FIG. 1, a schematic diagram showing one cylinder of a multi-cylinder engine 10 in an engine system 100 is shown. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 10 may include a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of an emission control device 70 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 70 is shown arranged along the exhaust passage 48 downstream of the exhaust gas sensor 126. The device 70 may be a three way catalyst (TWC), $NO_x$ trap, various other emission control devices, or combinations thereof. In some examples, during operation of the engine 10, the emission control device 70 may be periodically reset by operating at least one cylinder of the engine within a particular air-fuel ratio.

An exhaust gas recirculation (EGR) system 140 may route a desired portion of exhaust gas from the exhaust passage 48 to the intake manifold 44 via an EGR passage 152. The amount of EGR provided to the intake manifold 44 may be varied by the controller 12 via an EGR valve 144. Under some conditions, the EGR system 140 may be used to regulate the temperature of the air-fuel mixture within the combustion chamber, thus providing a method of controlling the timing of ignition during some combustion modes.

The controller 12 is shown in FIG. 2 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

As described above, FIG. 1 shows only one cylinder of a multi-cylinder engine, and each cylinder may similarly include its own set of intake/exhaust valves, fuel injector, spark plug, etc.

Referring now to FIG. 2, a block diagram of a vehicle driveline 200 is shown. Driveline 200 may be powered by engine 10 as shown in greater detail in FIG. 1. In one example, engine 10 may be a gasoline engine. In alternate examples, other engine configurations may be employed, for example, a diesel engine. Engine 10 may be started with an engine starting system (not shown). Further, engine 10 may generate or adjust torque via torque actuator 204, such as a fuel injector, throttle, etc.

An engine output torque may be transmitted to torque converter 206 to drive an automatic transmission 208 by engaging one or more clutches, including forward clutch 210 and gear clutches 211, where the torque converter may be referred to as a component of the transmission. Torque converter 206 includes an impeller 220 that transmits torque to turbine 222 via hydraulic fluid. One or more gear clutches 211 may be engaged to change mechanical advantage between the engine vehicle wheels 214. Impeller speed may be determined via speed sensor 225, and turbine speed may be determined from speed sensor 226 or from vehicle speed sensor 230. The output of the torque converter may in turn be controlled by torque converter lock-up clutch 212. As such, when torque converter lock-up clutch 212 is fully disengaged, torque converter 206 transmits torque to automatic transmission 208 via fluid transfer between the torque converter turbine and torque converter impeller, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque relayed to the transmission to be adjusted. A controller 12 may be configured to adjust the amount of torque transmitted by the torque converter by adjusting the torque converter lock-up clutch in response to various engine operating conditions, or based on a driver-based engine operation request.

Torque output from the automatic transmission 208 may in turn be relayed to wheels 214 to propel the vehicle. Specifically, automatic transmission 208 may adjust an input driving torque at the input shaft (not shown) responsive to a vehicle traveling condition before transmitting an output driving torque to the wheels.

Further, wheels 214 may be locked by engaging wheel brakes 216. In one example, wheel brakes 216 may be engaged in response to the driver pressing his foot on a brake pedal (not shown). In the similar way, wheels 214 may be unlocked by disengaging wheel brakes 216 in response to the driver releasing his foot from the brake pedal.

A mechanical oil pump (not shown) may be in fluid communication with automatic transmission 208 to provide hydraulic pressure to engage various clutches, such as forward clutch 210 and/or torque converter lock-up clutch 212. The mechanical oil pump may be operated in accordance with torque converter 206, and may be driven by the rotation of the engine or transmission input shaft, for example. Thus, the hydraulic pressure generated in mechanical oil pump may increase as an engine speed increases, and may decrease as an engine speed decreases.

Referring now to FIG. 3, an example version of engine 10 that includes multiple cylinders arranged in a V configuration is shown. In this example, engine 10 is configured as a variable displacement engine (VDE). Engine 10 includes a plurality of combustion chambers or cylinders 30. The plurality of cylinders 30 of engine 10 are arranged as groups of cylinders on distinct engine banks. In the depicted example, engine 10 includes two engine cylinder banks 30A, 30B. Thus, the cylinders are arranged as a first group of cylinders (four cylinders in the depicted example) arranged on first engine bank 30A and labeled A1-A4, and a second group of cylinders (four cylinders in the depicted example) arranged on second engine bank 30B labeled B1-B4. It will be appreciated that while the example depicted in FIG. 3 shows a V-engine with cylinders arranged on different banks, this is not meant to be limiting, and in alternate examples, the engine may be an in-line engine with all engine cylinders on a common engine bank.

Engine 10 can receive intake air via an intake passage 42 communicating with branched intake manifold 44A, 44B. Specifically, first engine bank 30A receives intake air from intake passage 42 via a first intake manifold 44A while second engine bank 30B receives intake air from intake passage 142 via second intake manifold 44B. While engine banks 30A, 30B are shown with a common intake manifold, it will be appreciated that in alternate examples, the engine may include two separate intake manifolds. The amount of air supplied to the cylinders of the engine can be controlled by adjusting a position of throttle 62 on throttle plate 64. Additionally, an amount of air supplied to each group of cylinders on the specific banks can be adjusted by varying an intake valve timing of one or more intake valves coupled to the cylinders.

Combustion products generated at the cylinders of first engine bank 30A are directed to one or more exhaust catalysts in first exhaust manifold 48A where the combustion products are treated before being vented to the atmosphere. A first emission control device 70A is coupled to first exhaust manifold 48A. First emission control device 70A may include one or more exhaust catalysts, such as a close-coupled catalyst. In one example, the close-coupled catalyst at emission control device 70A may be a three-way catalyst. Exhaust gas generated at first engine bank 30A is treated at emission control device 70A Combustion products generated at the cylinders of second engine bank 30B are exhausted to the atmosphere via second exhaust manifold 48B. A second emission control device 70B is coupled to second exhaust manifold 48B. Second emission control device 70B may include one or more exhaust catalysts, such as a close-coupled catalyst. In one example, the close-coupled catalyst at emission control device 70A may be a three-way catalyst. Exhaust gas generated at second engine bank 30B is treated at emission control device 70B.

As described above, a geometry of an exhaust manifold may affect an exhaust gas sensor measurement of an air-fuel ratio of a cylinder during nominal engine operation. During nominal engine operation (e.g., all engine cylinder operating at stoichiometry), the geometry of the exhaust manifold may allow the air-fuel ratio of certain cylinders of an engine bank to be read more predominantly when compared to other cylinders of the same bank, thus reducing a sensitivity of the exhaust gas sensor to detect an air-fuel ratio imbalance of an individual sensor. For example, engine bank 30A comprises four cylinders A1, A2, A3, and A4. During nominal engine operation, exhaust gas from A4 may flow toward a side of the exhaust manifold nearest the exhaust gas sensor 126A and therefore, give a strong, accurate exhaust sensor reading. However, during nominal engine operation, exhaust gas from A1 may flow toward a side of the exhaust manifold farthest from the exhaust gas sensor 126A and therefore, give a weak, inaccurate exhaust sensor reading. In this way, it may be difficult to attribute an air-fuel ratio (e.g., lambda) to cylinder A1 with great certainty during nominal engine operation. Thus, it may be preferred to deactivate all but one cylinder of an engine bank and to infer cylinder air-fuel ratio of the activated cylinder via torque produced by the activated cylinder. Additionally, torque produced by the activated cylinder is not affected by air that is pumped into the exhaust manifolds during cylinder deactivation via deactivated cylinders. Thus, torque produced via an activated cylinder may be decoupled from conditions produced by deactivated cylinders, whereas an air-fuel ratio signal of an activated cylinder may be corrupted via fresh air pumped via deactivated cylinders so as to make air-fuel variation detection via an oxygen sensor more difficult.

While FIG. 3 shows each engine bank coupled to respective underbody emission control devices 70A and 70B, in alternate examples, each engine bank may be coupled to a common underbody emission control device positioned downstream in a common exhaust passageway.

Various sensors may be coupled to engine 10. For example, a first exhaust gas sensor 126A may be coupled to the first exhaust manifold 48A of first engine bank 30A, upstream of first emission control device 70A while a second exhaust gas sensor 126B is coupled to the second exhaust manifold 48B of second engine bank 30B, upstream of second emission control device 70B. In further examples, additional exhaust gas sensors may be coupled downstream of the emission control devices. Still other sensors, such as temperature sensors, may be included, for example, coupled to the underbody emission control device(s). As elaborated in FIG. 1, the exhaust gas sensors 126A and 126B may include exhaust gas oxygen sensors, such as EGO, HEGO, or UEGO sensors.

One or more engine cylinders may be selectively deactivated during selected engine operating conditions. For example, during DFSO, one or more cylinders of an engine may be deactivated while the engine continues to rotate. The cylinder deactivation may include deactivating fuel and spark to the deactivated cylinders. In addition, air may continue to flow through the deactivated cylinders in which an exhaust gas sensor may measure a maximum lean air-fuel ratio upon entering the DFSO. In one example, an engine controller may selectively deactivate all the cylinders of an engine during a mode change to DFSO and then reactivate all the cylinders during a mode change back to non-DFSO mode.

Engine 10 may have a firing order of 1-3-7-2-6-5-4-8 where cylinder B1 is cylinder number one, cylinder B2 is cylinder number 2, cylinder B3 is cylinder number 3, cylinder B4 is cylinder number 4, cylinder A1 is cylinder number 5, cylinder A2 is cylinder number 6, cylinder A3 is cylinder number 7, and cylinder A4 is cylinder number 8.

In this way, the system of FIGS. 1-3 enables learning of air-fuel ratio imbalances in each cylinder, wherein each cylinder includes a port injector and a direct injector. Furthermore, wherein each cylinder fueled via consecutive first and second fuel pulses of differing fuel pulse width from an injector includes each cylinder fueled via consecutive first and second pulses of differing pulse width from one of the port injector and the direct injector on a first cylinder event, and then the cylinder fueled via consecutive first and second pulses of differing pulse width from the other of the port injector and the direct injector on a second, subsequent cylinder event of the cylinder.

Referring now to FIG. 4, an example method 400 for determining DFSO conditions in a motor vehicle is shown. DFSO may be used to increase fuel economy by shutting-off fuel injection to one or more cylinders of an engine and ceasing combustion in the deactivated cylinders. In some examples, an open-loop air-fuel ratio control during DFSO may be used to produce torque in selected cylinders while remaining cylinders are deactivated due to activation of DFSO operating mode. DFSO conditions are described in further detail below.

Method 400 begins at 402, which includes determining, estimating, and/or measuring current engine operating parameters. The current engine operating parameters may include but are not limited to a vehicle speed, throttle position, and/or an air-fuel ratio. Method 400 proceeds to 404 after engine operating conditions are determined.

At 404, the method 400 includes determining if one or more DFSO activation conditions are met. DFSO conditions may include but are not limited to one or more of an accelerator not being depressed 406, a constant or decreasing vehicle speed 408, and a brake pedal being depressed 410. An accelerator position sensor may be used to determine the accelerator pedal position. The accelerator pedal position may occupy a base position when the accelerator pedal is not applied or depressed, and the accelerator pedal may move away from the base position as accelerator application is increased. Additionally or alternatively, accelerator pedal position may be determined via a throttle position sensor in examples where the accelerator pedal is coupled to the throttle or in examples where the throttle is operated in an accelerator pedal follower mode. A constant or decreasing vehicle speed may be preferred for a DFSO to occur due to a torque demand being either constant or not increasing. The vehicle speed may be determined by a vehicle speed sensor. The brake pedal being depressed may be determined via a brake pedal sensor. In some examples, other suitable conditions may exist for DFSO to occur.

At 412, the method 400 judges if one or more of the above listed DFSO conditions are met. If the condition(s) is met, the answer is yes and method 400 proceeds to 502 of method 500, which will be described in further detail with respect to FIG. 5. If none of the conditions are met, the answer is no and method 400 proceeds to 414 maintain current engine operating parameters and not initiate DFSO. The method may exit after current engine operating conditions are maintained.

In some examples, a GPS/navigation system may be used to predict when DFSO conditions will be met. Information used by the GPS to predict DFSO conditions being met may include but is not limited to route direction, traffic information, and/or weather information. As an example, the GPS may be able to detect traffic downstream of a driver's current path and predict one or more of the DFSO condition(s) occurring. By predicting one or more DFSO condition(s) being met, the controller may be able to plan when to initiate DFSO.

Method 400 is an example method for a controller (e.g., controller 12) to determine if a vehicle may enter DFSO. Upon meeting one or more DFSO conditions, the controller (e.g., the controller in combination with one or more additional hardware devices, such as sensors, valves, etc.) may perform method 500 of FIG. 5.

Referring now to FIG. 5, an exemplary method 500 for determining if open-loop air-fuel ratio control conditions are met is shown. In one example, open-loop air-fuel ratio control may be initiated after a threshold number of vehicle miles are driven (e.g., 2500 miles). In another example, open-loop air-fuel ratio control may be initiated during the next DFSO event after sensing an air-fuel ratio disturbance downstream of a catalyst which may be indicative or cylinder to cylinder air-fuel imbalance during standard engine operating conditions (e.g., all cylinders of an engine are firing). During the open-loop air-fuel ratio control, a selected group of cylinders may be fired (e.g., combustion may be performed in the select group of cylinders) while remaining cylinders remain deactivated in DFSO mode.

Referring now to FIG. 5, method 500 will be described herein with reference to components and systems depicted in FIGS. 1-3, particularly, regarding engine 10, cylinder banks 30A and 30B, sensor 126, and controller 12. Method 500 may be carried out by controller 12 according to computer-readable media stored thereon. It should be understood that the method 500 may be applied to other systems of a different configuration without departing from the scope of this disclosure.

Method 500 begins at 502 where DFSO is initiated based on determination of DFSO conditions being met during method 400. Initiating DFSO includes shutting off a fuel supplied to all the cylinders of the engine such that combustion may no longer occur (e.g., deactivating the cylinders). Method 500 proceeds to 504 after DFSO is initiated.

At 504, the method 500 determines if conditions for determining and/or correcting cylinder air-fuel imbalance were present during nominal engine operation prior to the DFSO. Conditions for correcting cylinder air-fuel imbalance may include but are not limited to the vehicle traveling a predetermined distance and/or catalyst breakthrough of engine exhaust gases as indicated by leaner or richer exhaust gases downstream of a catalyst. Further, in some examples, engine feed gas air-fuel ratio varying by more than a predetermined amount may be determined to indicate cylinder to cylinder air-fuel imbalance. If no air-fuel ratio imbalance was detected and/or the threshold distance was not traveled, the answer is no and method 500 proceeds to 506. If an air-fuel ratio imbalance was detected, the answer is yes and method 500 proceeds to 508.

At 506, method 500 continues operating the engine in DFSO mode until conditions are present where exiting DFSO is desired. In one example, exiting DFSO may be desired when a driver applies the accelerator pedal or when engine speed is reduced to less than a threshold speed. Method 500 exits if conditions are present to exit DFSO mode.

At 508, method 500 monitors conditions for entering open-loop air-fuel. For example, method 500 senses an air-fuel ratio or lambda in the exhaust system (e.g., via monitoring exhaust oxygen concentration) to determine if combusted byproducts have been exhausted from engine cylinders and the engine cylinders are pumping fresh air. After DFSO is initiated, the engine exhaust evolves progressively leaner until the lean air-fuel ratio reaches a saturated value. The saturated value may correspond to an oxygen concentration of fresh air, or it may be slightly richer than a value that corresponds to fresh air since a small amount of hydrocarbons may exit the cylinders even though fuel injection has been cut-off for several engine revolutions. Method 500 monitors the engine exhaust to determine if oxygen content in the exhaust gases has increased to greater than a threshold value. The conditions may further include identifying if a vehicle is proceeding at a constant speed or decreasing speed. Method 500 continues to 510 after beginning to monitor the exhaust air-fuel ratio.

At 510, method 500 judges if conditions to enter open-loop air-fuel control have been met. In one example, the select conditions are that the exhaust air-fuel ratio is leaner that a threshold value for a predetermined amount of time (e.g., 1 second). In one example, the threshold value is a value that corresponds to being within a predetermined percentage (e.g., 10%) of a fresh air reading sensed at the oxygen sensor. If the conditions are not met, the answer is no and method 500 returns to 508 to continue to monitor if select conditions for entering open-loop air-fuel control have been met. If the conditions for open-loop air-fuel ratio control are met, the answer is yes and method 500 proceeds to 512 to initiate open-loop air-fuel ratio control. The method 500 proceeds to 602 of method 600 if conditions for open-loop fuel control are present.

The inventors herein have determined that engine torque estimates of one cylinder may be influenced by torque produced by cylinders adjacent in a firing order of the engine because there may be less than 100 crankshaft degrees of separation between engine torque pulses. Further, cylinder air-fuel ratios sensed via an oxygen sensor may be influenced due to geometry of an exhaust passage relative to a location of an exhaust sensor or other conditions. The inventors have further determined that during DFSO, an improved cylinder torque estimate for a cylinder may be provided since torque production of deactivated cylinders is low. Further, cylinder torque estimates may not be influenced by exhaust system geometry or oxygen sensor location.

Method 500 may be stored in non-transitory memory of controller (e.g., controller 12) to determine if a vehicle may initiate open-loop air-fuel ratio control during DFSO. Upon meeting one or more open-loop air-fuel ratio control conditions, the controller (e.g., the controller in combination with one or more additional hardware devices, such as sensors, valves, etc.) may perform method 600 of FIG. 6.

FIG. 6 illustrates an exemplary method 600 for performing the open-loop air-fuel ratio control. In one example, open-loop air-fuel ratio control may select a cylinder group in which to reactivate combusting air-fuel mixtures and monitor the air-fuel ratio of the cylinder group during the DFSO. In one example, the cylinder group may be a pair of corresponding cylinders of separate cylinder banks. The cylinders may correspond to one another based on either a firing time or location. As an example, with respect to FIG. 3, cylinders A1 and B1 may comprise a cylinder group. Alternatively, the cylinders may be selected to combust air-fuel mixtures 360 crankshaft degrees apart to provide even firing and smooth torque production. Only a single cylinder may comprise the cylinder group for an in-line engine or for a V-engine, for example.

Method 600 will be described herein with reference to components and systems depicted in FIGS. 1-3, particularly, regarding engine 10, cylinder banks 30A and 30B, sensor 126, and controller 12. Method 600 may be carried out by the controller executing computer-readable media stored thereon. It should be understood that the method 600 may be applied to other engine systems of a different configuration without departing from the scope of this disclosure.

The approach described herein senses changes in output of the upstream exhaust gas oxygen sensor (UEGO) correlated to combustion events in cylinders that are reactivated during the DFSO event where the engine rotates and a portion of engine cylinders do not combust air-fuel mixtures. The UEGO sensor outputs a signal that is proportionate to oxygen concentration in the exhaust. And, since only one cylinder of a cylinder bank may be combusting air and fuel, the oxygen sensor output may be indicative of cylinder air-fuel imbalance for the cylinder combusting air and fuel. Thus, the present approach may increase a signal to noise ratio for determining cylinder air-fuel imbalance. In one example, the UEGO sensor output voltage (converted to air-fuel ratio or lambda (e.g., difference between air-fuel and air-fuel stoichiometric)) is sampled for every cylinder firing during a cylinder group firing after exhaust valves of the cylinder receiving fuel are opened. The sampled oxygen sensor signal is then evaluated to determine a lambda value or air-fuel ratio). The lambda value is expected to correlate to a desired lambda value (e.g., demanded lambda value).

Method 600 begins at 602 where a cylinder group is selected to be fired later during the open-loop air-fuel ratio control. Selection of the cylinder group may be based on one or more of a firing time and cylinder location, as described above. As one example, with respect to FIG. 3, the cylinders most upstream from an exhaust gas sensor (e.g., sensor 126) may be selected as the cylinder group (e.g., cylinders A1 and B1). Additionally or alternatively, cylinders with corresponding firing times may be selected as the cylinder group (e.g., cylinders A1 and B3). In some examples, the cylinders may combust 360 degrees apart to smooth engine torque production. Consequently, cylinders may be similar in firing time and location. For example, if cylinders A1 and B1 have complementary firing times and are the most upstream cylinders of the exhaust gas sensor. As an example, the cylinder group may comprise at least one cylinder. In some examples, the cylinder group may comprise a plurality of cylinders, further comprising only one cylinder from each cylinder bank. In this way, a number of cylinders in a cylinder group may be equal to a number of cylinder banks, in which each cylinder bank includes only one cylinder combusting air and fuel during an engine cycle (e.g., two revolutions for a four-stroke engine).

After selecting the cylinder group, method 600 proceeds to 603 to determine if conditions for fuel injection to the selected cylinder group are met. Conditions for initiating fuel injection may be determined as described in method 1000 of FIG. 10. If the fuel injection conditions are not met, then the method 600 may proceed to 604 to continue to monitor fuel injection conditions and determine if fuel injection conditions are met at a later point in time.

If the fuel injection conditions are met, the method 600 may proceed to 605 to combust air and fuel in the selected cylinder group (e.g., firing the cylinder group). Firing the selected cylinder group includes injecting two consecutive fuel pulses of different pulse width to only the selected cylinder group while maintaining the remaining cylinders as deactivated (e.g., no fuel injected) while the engine continues to rotate. The fuel pulse width corresponds to an amount of fuel injected to the cylinder. Thus the method 600 involves each cylinder fueled via consecutive first and second fuel pulses of differing fuel pulse width including each cylinder fueled via a first pulse having a first, larger pulse width followed by a second pulse having a second, smaller pulse width. A first lambda value is determined for the first fuel pulse based on a difference between a maximum lean air-fuel ratio and an air-fuel ratio of the first pulse, and a second lambda value is learned as a difference between the maximum lean air-fuel ratio and an air-fuel ratio of the second pulse at 606. A difference in lambda between the first lambda value and second lambda value is determined and compared to a difference between the first pulse width and the second pulse width in 608 in order to learn a fuel injector error at 610.

An example of injecting two consecutive fuel pulses in a cylinder group is shown at map 700 of FIG. 7. Therein, the first plot shows two sets of fuel pulses, each set including two consecutive fuel pulses of different pulse width injected into a cylinder group. The second plot shows an air-fuel ratio response estimated at an exhaust gas oxygen sensor (such as a UEGO sensor) after injection of two consecutive fuel pulses of different pulse width into a cylinder group. On the vertical axis of the first plot, a value of "1" represents a fuel injector injecting fuel (e.g., cylinder firing) and a value of "0" represents no fuel being injected (e.g., cylinder deactivated). The vertical axis of the second plot represents an exhaust gas sensor (UEGO) response in terms of lambda. The horizontal axes of each plot represent time and time increases from the left side of the figure to the right side of the figure.

As illustrated, injecting the first set of two consecutive fuel pulses of different pulse width, after T1 and before T2, includes injecting a first fuel pulse 702 having a larger pulse width, PW1, followed by injecting a second fuel pulse 704 having a smaller pulse width, PW2. The first pulse width may enrichen the air-fuel ratio by a first amount while the second pulse width may enrich the air-fuel ratio by a second amount, smaller than the first amount. The first and second pulses may also be separated by a duration 706. In one example, the duration may correspond to a duration that enables a first change in air-fuel ratio due to the first pulse to be differentiated from a second change in air-fuel ratio due to the second pulse. In addition, the duration 706 may be adjusted so that each of the first and second fuel pulse is injected over the same combustion event. In an alternative example, the duration elapsed between the consecutive first and the second fuel pulses may be based on one or more of engine speed and a response time of an exhaust gas oxygen sensor. As such, prior to the fuel injections, while the engine is in DFSO, the cylinder may be operating with a maximum lean air-fuel ratio, AFR0. Responsive to the first pulse, the air-fuel ratio may dip (that is, enrichen) by a first amount from the maximum lean air-fuel ratio as shown in 708 to produce an air-fuel ratio, AFR1. Responsive to the second pulse, the air-fuel ratio may dip by a second, different amount from the maximum lean air-fuel ratio as in 710 to produce an air-fuel ratio, AFR2. In addition, due to the duration elapsed between the first and second pulse, the air-fuel ratio may be dip (responsive to the first pulse) and then plateau before dipping again (responsive to the second pulse). The difference between the air-fuel ratio from the first pulse and the maximum lean air fuel ratio is defined herein as lambda1. Further, the difference between the air-fuel ratio from the second pulse and the maximum lean air fuel ratio is defined herein as lambda2. As elaborated herein, based on the relative change in lambda (that is, the difference between lambda1 and lambda 2), the engine controller may learn an error for the given injector. In particular, by comparing the actual change in lambda for the two pulses, delta lambda, to an expected change in lambda, wherein the expected change in lambda is based on either a difference between the first and second pulse width or difference in quantity of fuel between the first and second pulse (e.g., PW1-PW2), the controller may learn the injector error. The difference between delta lambda and the expected change in lambda is hereafter defined as the relative lambda variation. Further, since the error is learned based on the difference between the expected lambda and delta lambda, the injector error can be learned independent of an AFR error contribution from PCV or purge gases. Alternatively, the above analysis may be performed using more than a single set of fuel pulses, and an average of the multiple sets may be used to learn the injector error. As an example a second set of two consecutive fuel pulses may be injected into a cylinder of the cylinder group and the injector error may be learned based on a statistical or weighted average of the two sets may be used to learn the injector error. At T2, the cylinder is deactivated and the air-fuel ratio returns to the maximum lean air-fuel ratio.

Returning to the method 600 of FIG. 6, the two pulses injected into the selected group of cylinders may be fired one or more times to produce a selected air-fuel perturbation of exhaust air-fuel ratio after combustion products are exhausted after each combustion event in the reactivated cylinder. For example, the two consecutive pulses may be fired twice for each cylinder. Fuel is injected into the cylinder before the cylinder fires. For example, if the selected cylinder group comprises cylinders A1 and B1, then both cylinder A1 and cylinder B1 fire. Firing cylinder A1 produces an air-fuel perturbation in exhaust sensed via the oxygen sensor after the combusted mixture in cylinder A1 is expelled to the exhaust system. Firing cylinder B1 produces an air-fuel perturbation in the exhaust sensed via the oxygen sensor after the combusted mixture in cylinder B1 is expelled to the exhaust system. In other words, the combustion gases from cylinders A1 and B1 drive down (e.g., richen) the lean exhaust air-fuel ratios sensed in the respective exhaust passages when all cylinders were deactivated. As mentioned above, a selected cylinder(s) may combust air and fuel over one or more engine cycles while other cylinders remain deactivated and not receiving fuel.

The fuel injection may also include determining an amount of fuel to be injected in each of the two consecutive pulses, in which the total amount of fuel injected into the cylinder over the firing event may be less than a threshold injection. The threshold injection may be based on a drivability limit, in which injecting an amount of fuel greater than the threshold injection may reduce drivability. In addition to determining a total amount of fuel that is delivered over the two pulses, a relative amount of fuel to be injected in each fuel pulse may be determined so that a higher than threshold difference in air-fuel ratio is achieved following the pulses. In other words, the first pulse width and the second pulse width may be selected such that a difference between the first and second pulse width is higher than a threshold.

As depicted in FIG. 3, firing the selected cylinder comprising cylinder A1 and cylinder B1 results in exhaust gas from cylinder A1 flowing to sensor 126A and exhaust gas from cylinder B1 flowing to sensor 126B. In this way, each sensor measures only the exhaust gas of an individual cylinder and as a result, sensor blindness may be circumvented.

At 606, the method 600 determines a lambda value corresponding to each of the two consecutive fuel pulses each time combustion byproducts are released into the exhaust system from a cylinder combusting air and fuel. As used herein, determining a lambda value includes determining the difference between an air-fuel ratio from a given pulse and the maximum lean air-fuel ratio. Thus the lambda value for the first pulse is determined based on the difference between air-fuel ratio from the first pulse and the maximum lean air-fuel ratio. The lambda value may be correlated to the amount of fuel injected to the cylinder following the first pulse, and the amount of fuel injected to the cylinder may be based on a fuel pulse width applied to a fuel injector of the cylinder receiving fuel during the first pulse. The fuel pulse width corresponds to an amount of fuel injected to the cylinder. As one example, if both cylinders A1 and B1 are fired 10 times during the cylinder group firing, then 10 separate lambda values may be determined for each of the two consecutive pulses into cylinder A1 and cylinder B1. Method 600 proceeds to 608 after lambda values are determined.

At 608, a difference in the air-fuel ratio for the two consecutive pulses is compared to a corresponding difference between the first and second pulse widths of the two consecutive pulses. In other words, a first lambda for the first pulse is compared to a second lambda for the second pulse. As an example, as introduced with reference to FIG. 7, the first pulse may have a first pulse width PW1 which corresponds to a first amount of injected fuel mf1 and the first pulse may generate a first lambda value (from the maximum lean AFR at the DFSO condition) lambda1. Likewise, the second pulse may have a second pulse width PW2 which corresponds to a second amount of injected fuel mf2 and the second pulse may generate a second lambda value (from the maximum lean AFR at the DFSO condition) lambda2. The controller may compare the difference in fuel pulse widths (PW1-PW2), or the difference in fuel injection amounts (mf1-mf2) to the corresponding change in air-fuel ratio (lambda1-lambda2).

At 610, an injector error is learned based on the comparison. Specifically, assuming purge or PCV flow remains constant during the DFSO, the injector error is learned based on the difference between the first and second lambda relative to a corresponding difference between the first and second fuel injection amounts (or first and second pulse-widths), independent of any purge or PCV contribution.

Following the injection of two consecutive fuel pulses of different pulse width to a cylinder group, a mathematical expression may be developed relating air-fuel ratio to quantity of fuel injected, fuel injector error, amount of fuel vapor purged and quantity of air charge, as shown in Equation 1, where sum indicates the summation value of the variables in parenthesis. The term $AFR_n$ is the mean air-fuel ratio over one or multiple engine cycles, mfa is the quantity of total air charge, mfn is quantity of fuel injected in the cylinder for the nth fuel pulse, mfp is quantity of fuel vapor purged from the system and kc is coefficient of deviation of a fuel injector.

$$AFR_n = \frac{mfa}{\text{sum}(kc*mfn + mfp)} \qquad \text{Equation 1}$$

Assuming that the quantity of air charge and fuel vapor purged from system remains constant during the injector error learning (since a duration of the learning routine tends to be short), a relationship may be developed relating the deviation of a particular fuel injector in respect to commanded fuel quantity. In this example, two fuel pulses of different widths are delivered consecutively to the cylinder group and combusted, and resulting exhaust gas oxygen concentration corresponding to the different fuel pulses are determined. Subsequently, a system of equations may be developed (based on Equation 1), and solved to learn the deviation of a particular fuel injector with respect to commanded fuel quantity, kc as shown in Equation 2.

$$kc = \frac{mfa}{(mf2-mf1)} \frac{(AFR1 - AFR2)}{(AFR1*AFR2)} \qquad \text{Equation 2}$$

Since purge and PCV errors are assumed to be constant after injection of the first and second fuel pulse of different pulse width, differencing the lambda value of the two pulses results in cancellation of purge and PCV induced error. Thus, the fuel injector error learned is independent of deviations in air-fuel ratio related to purge and PCV fuel vapors.

A cylinder to cylinder air-fuel imbalance may result from the relative change in the AFR following the two consecutive fuel pulses of differing pulse width deviating from a desired or expected change in engine air-fuel ratio, where the expected change in air-fuel ratio is based on the difference in fuel pulse widths between the first and second fuel pulses. Herein, cylinder lambda variation is not determined based on comparing one or an average of lambda values of each pulse against an expected lambda value for that pulse because such a calculation would not accurately account for deviations in air-fuel ratio contributed by purge or PCV fuel vapors.

In one example, a difference between a predetermined maximum lean lambda value (e.g., 2.5λ) when air is being pumped through the engine without injecting fuel) and an actual lambda value for the first amount of fuel injected in the first pulse into the selected cylinder (e.g., 2.0λ) may be determined. The difference in this example produces a value of 0.5λ. Likewise, a difference between the predetermined maximum lean lambda value (e.g., 2.5λ) and an actual lambda value for the second amount of fuel injected in the second pulse into the selected cylinder (e.g., 0.5λ) may be determined. The difference in this example produces a value of 2.0λ. The first of ten lambda values for corresponding to the first pulse in cylinder A1 may be subtracted from the maximum lean lambda value to determine a first lambda difference (herein of 0.5λ) for the first pulse into cylinder A1 for the present DFSO event. Likewise, the first of ten lambda values for corresponding to the second pulse in cylinder A1 may be subtracted from the maximum lean lambda value to determine a second lambda difference (herein of 2.0λ) for the second pulse into cylinder A1 for the present DFSO event. The relative difference is then determined as 2.0−0.5=1.5λ. In the present example, the difference in fuel injection amount for the first and second fuel pulses (mf1-mf2) may, however, correspond to an expected relative difference of 1.8λ. The relative lambda variation for the present DFSO event is then determined by subtracting the actual lambda difference from the expected difference, and if the result is greater than a threshold, it may be determined that cylinder A1 exhibits air-fuel imbalance from other cylinders because its own change in air-fuel ratio does not match its expected change in air-fuel ratio. Alternatively, an average of the ten lambda values for the first and second pulses of cylinder A1 are subtracted from the maximum lean lambda value to determine a first average and second average lambda difference for the first and second pulses, respectively, to the cylinder A1 for the present DFSO event. If a difference between the average lambda difference for the present DFSO event is then subtracted from the expected lambda difference value (based on the first and second pulse widths), and if the result is greater than a threshold, it may be determined that cylinder A1 exhibits imbalance from other cylinders. The controller may inject more or less fuel during future cylinder combustions based on a magnitude of error between the expected lambda difference value and the actual/average lambda difference value. Thus method 600 during a deceleration fuel shut-off (DFSO) condition, with purge enabled, involves injecting consecutive first and second fuel pulses of differing pulse width from an injector into a cylinder and learning an error for the injector based on an actual change in lambda between the first and second pulses relative to an expected change in lambda, the change between a minimum reading (as shown in 708 and 710 of map 700) and a plateau reading immediately adjacent the minimum reading; and adjusting fueling from the injector based on the learned error following termination of the DFSO condition.

In another example, the expected value may be a predetermined single value that the lambda difference from the first and second fuel pulse of cylinder A1 are compared against. For example, if a single expected lambda value is equal to 2.0, but a cylinder combustion lambda from the first fuel pulse is 1.9 on a given combustion event and 0.4 from the second fuel pulse of the given combustion event, the lambda variation determined at 606 is 0.5, and a rich air-fuel ratio lambda variation may be determined. Alternatively, the single expected lambda value may be compared to the average of the difference of ten lambda values of the first and second fuel pulses for cylinder A1. The predetermined single expected value may be based on the difference in amount of fuel injected to cylinder A1 for combustion from the first and second fuel pulse, (mf1-mf2). The controller may inject more or less fuel during future cylinder combustions based on a magnitude of difference between the predetermined single lambda variation and the lambda variation determined at 606.

In yet another example, the expected value may be a range of lambda (e.g., 2.0λ-1.8λ). One or an average of the ten lambda values samples corresponding to the difference between the first and second fuel pulse lambda samples from cylinder A1 may be compared to the expected value range. If the one or average of lambda value samples is in the expected range, no imbalance is detected. However, if the one or average of lambda values samples is outside of the expected range, it may be determined that there is a cylinder lambda imbalance. Similar analysis with regard to cylinder B1 and other cylinders may be provided. The controller may inject more or less fuel during future cylinder combustions based on a magnitude of difference between the range of expected lambda values and the measured lambda value determined at 606. For example, if the expected value is a range between 2.0λ and 1.8λ, but the measured lambda value between the first and second pulse determined at 606 is 2.1λ, additional fuel may be injected to the cylinder because the lambda value of 2.1 is leaner than expected. The leaner lambda value is compensated by increasing the base amount of fuel injected to the cylinder by a factor based on the lambda error of 0.1.

If the one or average of the difference in lambda values from first and second fuel pulses from cylinder combustion is compared to the expected value and lambda variation is exhibited, the answer is yes and method 600 proceeds to 610. Otherwise, the answer is no and method 600 proceeds to 612.

It should also be noted that if a transmission shift request is made during the time fuel is injected to the reactivated cylinders, injection of fuel ceases until the shift is complete. If a transmission shift request occurs between injections in different cylinders as is shown in FIG. 9, injection of fuel and lambda variation analysis is delayed until the shift is complete. By not performing lambda analysis and fuel injection during the transmission shift, the possibility of inducing lambda variation may be reduced.

At 612, the method 600 judges if lambda values and lambda variations have been determined for all cylinders. If lambda values/variations of all cylinders have not been assessed and do not have one or more lambda values associated with the cylinders, then the answer is no and method 600 proceed to 613. Otherwise, the answer is yes and method 600 proceeds to 616.

At 613, method 600 judges whether or not DFSO conditions are met or present. A driver may apply an accelerator pedal or engine speed may fall to a speed less than desired so that DFSO conditions are not met. If DFSO conditions are not met, the answer is no and method 600 proceeds to 614. Otherwise, the answer is yes and method 600 proceeds to 615.

At 614, method 600 exits DFSO and returns to closed-loop air-fuel control. Cylinders are reactivated via supplying spark and fuel to the deactivated cylinders. In this way, the open-loop air-fuel ratio control is also disabled despite not having acquired lambda values for all cylinders of the engine. In some examples, if an open-loop air-fuel ratio control is disabled prematurely, then the controller may store any lambda values measured for a selected cylinder group(s) and consequently, select a different cylinder group(s) initially during the next open-loop air-fuel ratio control. Thus, if lambda values are not acquired for a cylinder group during an open-loop air-fuel ratio control, the cylinder group may be the first cylinder group for which lambda values are determined for establishing the presence or absence of imbalance during a subsequent DFSO event. The method 600 proceeds to exit after engine returns to closed-loop air-fuel control.

At 615, method 600 selects a next cylinder group for determining lambda values for establishing the presence or absence of imbalance. Selecting the next cylinder group may include selecting different cylinders other than the cylinders selected in the preceding cylinder group. For example, cylinders A3 and B3 may be selected instead of A1 and B1. Additionally or alternatively, the method 600 may select cylinder groups sequentially along a cylinder bank. For example, cylinders A2 and B3 may comprise a cylinder group after firing cylinders A1 and B1 of a selected cylinder group. Method 600 returns to 603 to reactivate the selected cylinder group, as described above.

At 616, method 600 deactivates open-loop air-fuel ratio control including terminating cylinder activation and selection of cylinder groups. Therefore, method 600 returns to nominal DFSO where all cylinders are deactivated and where cylinder imbalance is not determined. Method 600 proceeds to 618 after the engine re-enters nominal DFSO.

At 618, method 600 judges whether or not DFSO conditions are met. If the answer is no, method 600 proceeds to 620. Otherwise, the answer is yes and method 600 returns to 618. DFSO conditions may no longer be met if engine speed is reduced to less than a threshold or if the accelerator pedal is applied.

At 620, the method 600 exits DFSO and reactivates all cylinders in closed-loop fuel control. The cylinders may be reactivated according to the firing order of the engine. Method 600 proceeds to 622 after engine cylinders are reactivated.

At 622, method 600 adjusts cylinder operation of any cylinders exhibiting lambda variation as determined at 608. The adjusting may include adjusting amounts of fuel injected to engine cylinders via adjusting fuel injection timing, such as by advancing or retarding fuel injection timing. The fuel injection timing adjustments may be proportional to the lambda variation between the first and second fuel pulse as described at 608. For example, if the expected lambda variation is 2.0 and the measured lambda variation between the first and second fuel pulse is 1.8, then the error magnitude may be equal to 0.2, indicating a rich air-fuel ratio deviation in the particular cylinder. The adjusting may further include injecting a greater amount of fuel or a lesser amount of fuel based on the type of lambda variation error. For example, if one cylinder indicates rich lambda variation or error, then the adjustments may include one or more of injecting less fuel and providing more air to the cylinder. The method 600 may exit after applying the adjustments corresponding to the learned lambda errors for each cylinder.

It will be appreciated that in engine systems where each cylinder includes a direct injector and a port injector, the above approach using two consecutive fuel pulses of differing pulse width may be leveraged to learn and differentiate direct injector associated errors from port injector associated errors. For example, the controller may perform a first iteration of the routine to learn errors associated with a direct injector of each cylinder and then perform a second iteration of the routine to learn errors associated with a port injector of each cylinder (or vice versa).

Thus, the method of FIG. 6 provides for a method, comprising: during a deceleration fuel shut-off (DFSO) event, sequentially firing cylinders of a cylinder group, each cylinder fueled via consecutive first and second fuel pulses of differing fuel pulse width from an injector; and based on a lambda deviation between the first and second pulses, learning a fuel error for the injector and an air-fuel ratio imbalance for each cylinder. The method further comprises adjusting subsequent engine operation based on the indicated air-fuel ratio variation. The method includes wherein the cylinder group is selected based on one or more of a firing order and a cylinder position within the firing order. The method includes wherein fueling of the cylinder group upon which the indication of air-fuel imbalance is based occurs only after the maximum lean air-fuel ratio is measured during the DFSO.

In some examples, the method includes wherein adjusting subsequent engine operation includes adjusting a fuel injector pulse width based on the learned fuel error and the air-fuel ratio imbalance following termination of the DFSO. The method includes wherein an expected air-fuel ratio deviation is based on the difference in fuel pulse width between the first and second fuel pulses. The method includes wherein adjusting subsequent engine operation includes adjusting subsequent fuel injections to a cylinder based on the indicated air-fuel variation following termination of the DFSO. The method includes wherein the cylinder group is fueled and operated to perform a combustion cycle a plurality of times during the DFSO producing a plurality of air-fuel ratio responses that are together used to identify the imbalance.

FIG. 8 depicts an operating sequence 800 illustrating example results for an engine cylinder bank comprising three cylinders (e.g., V6 engine with two cylinder banks, each bank comprising three cylinders). Line 802 represents if DFSO is occurring or not, line 804 represents an injector of a first cylinder, line 806 represents an injector of a second cylinder, line 808 represents an injector of a third cylinder, and solid line 810 represents an exhaust gas sensor (UEGO) response in terms of lambda, dotted line 812 represents an expected lambda response, and line 814 represents a stoichiometric lambda value (e.g., 1). Line 812 is a same value as line 810 when only line 810 is visible. For lines 804, 806, and 808, a value of "1" represents a fuel injector injecting fuel (e.g., cylinder firing) and a value of "0" represents no fuel being injected (e.g., cylinder deactivated). The horizontal axes of each plot represent time and time increases from the left side of the figure to the right side of the figure.

Prior to T1, the first, second, and third cylinders are firing under nominal engine operation (e.g., stoichiometric air-fuel ratio), as illustrated by lines 804, 806, and 808 respectively. As a result, the cylinders produce lambda values substantially equal to 1, as indicated by line 810 and line 814. The lambda value may be calculated by a controller (e.g., controller 12) from oxygen concentration in the engine exhaust system as measured by an exhaust gas sensor (e.g., sensor 126). DFSO is disabled at this time, as indicated by line 802.

At T1, DFSO conditions are met and DFSO is initiated, as described above with respect to FIG. 4. As a result, fuel is no longer injected into all the cylinders of the engine (e.g., cylinders are deactivated) and the air-fuel ratio more leaner and increases to a maximum air-fuel ratio, which corresponds to pumping air though engine cylinders without injecting fuel.

After T1 and prior to T2, DFSO continues and the air-fuel ratio continues to increase to the maximum lean air-fuel ratio. The injectors may not begin injecting fuel until a threshold time (e.g., 5 seconds) has passed subsequent to initiating the DFSO. Additionally or alternatively, the injectors may begin injecting fuel in response to the maximum air-fuel ratio being detected by the UEGO sensor. Conditions for firing a selected cylinder group are monitored.

At T2, the first cylinder is activated due to conditions for firing the selected cylinder group being met (e.g., no zero point torque, vehicle speed is less than a threshold vehicle speed, and no downshift) and therefore, injector 1 injects two sets of consecutive first and second fuel pulses of differing fuel pulse width into the first cylinder. As described above, a selected cylinder group may comprise at least one cylinder from each cylinder bank. That is to say, the number of cylinder banks may be equal to the number of cylinders in the cylinder group, in which each cylinder bank provides one cylinder to the cylinder group. Additionally or alternatively, a selected cylinder group for an in-line engine may comprise at least one cylinder of the engine.

After T2 and prior to T3, the first cylinder is combusting. As shown, the first cylinder combusts four times and produces four separate fuel pulse widths, each fuel pulse width corresponding to a single combustion event. The exhaust oxygen concentration is measured by the UEGO sensor (e.g., exhaust gas sensor) and the controller produces a lambda value corresponding to each combustion event based on UEGO output. As will be appreciated by one skilled in the art, other suitable numbers of firings may be performed. As depicted, the fuel injections to the first cylinder produce different lambda values, each corresponding to the quantity of fuel injected. However, in some examples, the open-loop air-fuel ratio control may determine to inject similar amounts of fuel such that each injection provides similar amount of fuel injected and similar lambda values.

The first cylinder measured lambda values are compared to an expected lambda value, line 812. If the measured lambda values are not equal to the expected lambda value, then an air-fuel ratio variation or lambda value that may cause cylinder to cylinder air-fuel imbalance may be indicated and learned, as described above with respect to FIG. 6. However, as depicted, the first cylinder lambda values are similar to the expected lambda values, thus no air-fuel ratio variation or error value is learned.

In some examples, a fired cylinder may produce a lambda difference between the first and second fuel pulse, (e.g., 2.5−2.0=0.5). The lambda difference may be compared to an expected lambda difference. If the lambda difference is not substantially equal to the expected difference then an air-fuel ratio imbalance may be indicated and learned. The learned imbalance may be based on an error magnitude. For example, if a measured lambda deviation between the first and second fuel pulse is 0.5, but an expected lambda difference is 0.4, then an error magnitude of 0.1 exists. In this way, the learned fueling error may be the basis for adjusting fueling operations for fuel injection subsequent the DFSO. For example, the base fuel amount to achieve a desired lambda value in a cylinder may be adjusted proportional to the error magnitude of 0.1 to correct the cylinder lambda variation.

In some examples, additionally or alternatively, the measured lambda deviation between the first and second pulse may be compared to a threshold range, as described above. If the measured lambda difference is not within the threshold range, then an imbalance may be indicated and learned. Additionally or alternatively, in some examples, the open-loop air-fuel ratio control may operate for a given number of time and the results may be averaged to indicate an air-fuel ratio imbalance, if any.

At T3, the first cylinder is deactivated and DFSO continues. The air-fuel ratio returns to the maximum lean air-fuel ratio. After T3 and prior to T4, the DFSO continues without firing a selected cylinder group. As a result, the air-fuel ratio remains at the maximum lean air-fuel ratio. The open-loop air-fuel ratio control may select a next cylinder group to fire. The open-loop air-fuel ratio control may allow the air-fuel ratio to return to the maximum lean air-fuel ratio prior to firing the next cylinder group in order maintain a consistent background (e.g., the maximum lean air-fuel ratio) for each cylinder group. Conditions for firing the next cylinder group are monitored.

In some examples, additionally or alternatively, firing the next cylinder group may occur directly after firing a first cylinder group. In this way, the open-loop air-fuel ratio control may select the next cylinder group at T3 and not allow the lambda to return to the maximum lean air-fuel ratio, for example.

At T4, the second cylinder is activated and injector 2 injects two sets of consecutive first and second fuel pulses of differing fuel pulse width into the second cylinder due to cylinder firing conditions being met. The DFSO continues and the first and third cylinders remain deactivated. After T4 and prior to T5, the second cylinder is fired four times and four fuel pulse widths are produced, each fuel pulse width corresponding to a single combustion event in the second cylinder. The exhaust oxygen concentration is converted into a measured lambda value corresponding to a lambda value for each fuel pulse for the second cylinder. The measured lambda values of the second cylinder are substantially equal to the expected lambda values. Therefore, no air-fuel ratio imbalance is learned.

At T5, the second cylinder is deactivated and as a result, the lambda value increases towards the maximum lean air-fuel ratio lambda value. DFSO continues. After T5 and prior to T6, the open-loop air-fuel ratio control selects a next cylinder group and allows the lambda to return to the maximum lean air-fuel ratio prior to firing the next cylinder group. DFSO continues with all the cylinders remaining deactivated. Conditions for firing the next cylinder group are monitored.

At T6, the third cylinder is activated and injector 3 injects two sets of consecutive first and second fuel pulses of differing fuel pulse width into the third cylinder due to cylinder firing conditions being met. The DFSO continues and the first and second cylinders remains deactivated. After T6 and prior to T7, the third cylinder is fired four times and four fuel pulse widths are produced, each fuel pulse width corresponding to a single combustion event within the third cylinder. The exhaust gas oxygen concentration is converted into measured lambda values corresponding to combustion events in the third cylinder. The measured lambda values of the third cylinder are less than the expected lambda value line 812. Therefore, the third cylinder has an air-fuel ratio imbalance, more specifically, a lean air-fuel ratio error or variance. The air-fuel error or lambda error for the third cylinder is learned and may be applied to future third cylinder operations during engine operations subsequent the DFSO.

At T7, the third cylinder is deactivated and thus all the cylinder are deactivated. The open-loop air-fuel ratio control is deactivated and DFSO may continue until DFSO conditions are no longer met. After T7 and prior to T8, DFSO continues and all cylinders remain deactivated. The lambda measured by the UEGO sensor is equal to the maximum lean air-fuel ratio.

At T8, the DFSO conditions are no longer met (e.g., tip-in occurs) and the DFSO is deactivated. Deactivating the DFSO includes injecting fuel into all the cylinders of the engine. Therefore, the first cylinder receives fuel from the injector 1 and the second cylinder receives fuel from the injector 2 without any adjustments learned during the open-loop air-fuel ratio control. The fuel injector of the third cylinder may receive fuel injection timing adjustments based on the learned air-fuel ratio variation to increase or decrease fuel supplied to the third cylinder. The adjustment(s) may include injecting an increased amount of fuel compared to fuel injections during similar conditions prior to the DFSO because the learned air-fuel ratio variation is based on a lean air-fuel ratio variation. By injecting an increased amount of fuel, the third cylinder air-fuel ratio may be substantially equal to a stoichiometric air-fuel ratio (e.g., lambda equal to 1). After T8, nominal engine operation continues. DFSO remains deactivated. The first, second, and third cylinders are fired and the UEGO sensor measures a lambda value substantially equal to stoichiometric.

Referring now to FIG. 9, a vehicle DFSO sequence where lambda variation analysis is delayed to reduce the possibility of lambda error is shown. Sequence 900 shows fuel injection for a second cylinder being delayed in response to a transmission shift request. Example results for an engine cylinder bank comprising three cylinders (e.g., V6 engine with two cylinder banks, each bank comprising three cylinders) are shown. Line 902 represents if DFSO is occurring or not, line 904 represents an injector of a first cylinder, line 906 represents an injector of a second cylinder, line 908 represents whether or not a transmission shift request is present, and solid line 910 represents an exhaust gas sensor (UEGO) response in terms of lambda, dotted line 912 represents an expected lambda response, and line 914 represents a stoichiometric lambda value (e.g., 1). Line 912 is a same value as line 910 when only line 910 is visible. For lines 904 and 906, a value of "1" represents a fuel injector injecting fuel (e.g., cylinder firing) and a value of "0" represents no fuel being injected (e.g., cylinder deactivated). A transmission shift request is present when line 908 is at a higher level. A transmission shift request is not present when line 908 is at a lower level. The horizontal axes if each line represent time and time increases from the left side of the figure to the right side of the figure.

Prior to T10, the first and second cylinders are firing under nominal engine operation (e.g., stoichiometric air-fuel ratio), as illustrated by lines 904 and 906. A transmission shift is not requested. The cylinders produce exhaust lambda values substantially equal to 1, as indicated by line 910 and line 914. The lambda value may be calculated by a controller (e.g., controller 12) from oxygen concentration in the engine exhaust system as measured by an exhaust gas sensor (e.g., sensor 126). DFSO is disabled, as indicated by line 902.

At T10, DFSO conditions are met and DFSO is initiated, as described above with respect to FIG. 4. As a result, fuel is no longer injected into all the cylinders of the engine (e.g., cylinders are deactivated) and the air-fuel ratio more leaner and increases to a maximum air-fuel ratio, which corresponds to pumping air though engine cylinders without injecting fuel.

After T10 and prior to T11, DFSO continues and the air-fuel ratio continues to increase to the maximum lean air-fuel ratio. The injectors may not begin injecting fuel until a threshold time (e.g., 5 seconds) has passed subsequent to initiating the DFSO. Additionally or alternatively, the injectors may not begin injecting fuel until the maximum air-fuel ratio is detected by the UEGO sensor. Conditions for firing a selected cylinder group are monitored.

At T11, the first cylinder is activated due to conditions for firing the selected cylinder group being met (e.g., no zero point torque, vehicle speed is less than a threshold vehicle speed, and no downshift) and therefore, injector 1 injects two sets of consecutive first and second fuel pulses of differing fuel pulse width into the first cylinder. As described above, a selected cylinder group may comprise at least one cylinder from each cylinder bank. That is to say, the number of cylinder banks may be equal to the number of cylinders in the cylinder group, in which each cylinder bank provides one cylinder to the cylinder group. Additionally or alternatively, a selected cylinder group for an in-line engine may comprise at least one cylinder of the engine. Furthermore, the selected cylinder group may be selected based on one or more of a firing order and location, in which the cylinders are sequentially selected to comprise a selected cylinder group to be fired. For example, with respect to FIG. 3, cylinders A1 and B1 may comprise a first selected cylinder group. After testing the first selected cylinder group, a second selected cylinder group may comprise cylinders A2 and B2 to be fired. In this way, the cylinders may be selected sequentially for future select cylinder groups.

After T11 and prior to T12, the first cylinder is combusting. As shown, the first cylinder combusts four times and produces four separate fuel pulse widths, each fuel pulse width corresponding to a single combustion event. The exhaust oxygen concentration is measured by the UEGO sensor (e.g., exhaust gas sensor) and the controller produces a lambda value corresponding to each combustion event based on UEGO output. As will be appreciated by one skilled in the art, other suitable numbers of firings may be performed. As depicted, the fuel injections to the first cylinder produce different lambda values upon combustion. However, in some examples, the open-loop air-fuel ratio control may determine to inject similar amounts of fuel such that each injection provides equal amount of fuel injected and similar lambda values.

The first cylinder measured lambda values are compared to an expected lambda value, line 912. If the measured lambda values are not equal to the expected lambda value, then an air-fuel ratio variation or lambda value that may cause cylinder to cylinder air-fuel imbalance may be indicated and learned, as described above with respect to FIG. 6. However, as depicted, the first cylinder lambda values are equal to the expected lambda values, thus no air-fuel ratio variation or error value is learned.

At T12, the first cylinder is deactivated and DFSO continues. The air-fuel ratio returns to the maximum lean air-fuel ratio. After T12 and prior to T13, the DFSO continues without firing a selected cylinder group. As a result, the air-fuel ratio remains at the maximum lean air-fuel ratio. The open-loop air-fuel ratio control may select a next cylinder group to fire. The open-loop air-fuel ratio control may allow the air-fuel ratio to return to the maximum lean air-fuel ratio prior to firing the next cylinder group in order maintain a consistent background (e.g., the maximum lean air-fuel ratio) for each cylinder group. Conditions for firing the next cylinder group are monitored.

At T13, the second cylinder is prepared for activation, but a request for a transmission shift is made as indicated by line 908 transitioning to a higher level. The second cylinder activation is delayed in response to the transmission shift request to reduce the possibility of inducing lambda errors in the output of the second cylinder. The engine stays in DFSO and the shift commences. Activation of the second cylinder is delayed until the shift is complete. The shift (e.g., a downshift) is complete shortly before time T14.

At T14, the second cylinder is activated and injector 2 injects two sets of consecutive first and second fuel pulses of differing fuel pulse width into the second cylinder due to cylinder firing conditions being met. The DFSO continues and the first cylinder remains deactivated. After T14 and prior to T15, the second cylinder is fired four times and four fuel pulse widths are produced, each fuel pulse width corresponding to a single combustion event in the second cylinder. The exhaust oxygen concentration is converted into a measured lambda value corresponding to a lambda value for the second cylinder. The measured lambda values of the second cylinder are substantially equal to the expected lambda values. Therefore, no air-fuel ratio imbalance is learned.

At T15, the second cylinder is deactivated and as a result, the lambda value increases towards the maximum lean air-fuel ratio lambda value. DFSO continues. After T15 and prior to T16, the open-loop air-fuel ratio control allows the lambda to return to the maximum lean air-fuel ratio. DFSO continues with all the cylinders remaining deactivated.

At T16, DFSO conditions are no longer present so the first and second cylinders are reactivated. The engine air-fuel ratio resumes stoichiometric and the engine begins to produce positive torque.

Thus, analysis of lambda variation and firing of cylinders while the engine's remaining cylinders remain deactivated may be delayed in response to a transmission request. Further, if a transmission request occurs when a cylinder is active while other cylinders are deactivated, lambda variation analysis including firing the one active cylinder may be delayed until the shift is complete. In this way, the possibility of lambda errors due to transmission gear shifting may be reduced.

Alternatively, air-fuel ratio imbalance in cylinder groups may be determined using a second method based on injecting two consecutive fuel pulses and learning changes in torque production correlated to perturbation in crankshaft acceleration.

Method 500 may be stored in non-transitory memory of controller (e.g., controller 12) to determine if a vehicle may initiate open-loop air-fuel ratio control during DFSO. Upon meeting one or more open-loop air-fuel ratio control conditions, the controller (e.g., the controller in combination with one or more additional hardware devices, such as sensors, valves, etc.) may perform method 1000 of FIG. 10.

FIG. 10 illustrates an exemplary method 1000 for performing the open-loop air-fuel ratio control. In one example, open-loop air-fuel ratio control may select a cylinder group in which to reactivate combusting air-fuel mixtures and monitor changes in torque production during the DFSO. In one example, the cylinder group may be a pair of corresponding cylinders of separate cylinder banks. The cylinders may correspond to one another based on either a firing time or location. As an example, with respect to FIG. 3, cylinders A1 and B1 may comprise a cylinder group. Alternatively, the cylinders may be selected to combust air-fuel mixtures 360 crankshaft degrees apart to provide even firing and smooth torque production. Only a single cylinder may comprise the cylinder group for an in-line engine or for a V-engine, for example.

Method 1000 will be described herein with reference to components and systems depicted in FIGS. 1-3, particularly, regarding engine 10, cylinder banks 30A and 30B, and controller 12. Method 1000 may be carried out by the controller executing computer-readable media stored thereon. It should be understood that the method 1000 may be applied to other engine systems of a different configuration without departing from the scope of this disclosure.

The approach described herein senses changes in torque, TQ (using information from a sensor that measures changes in crankshaft acceleration), correlated to combustion events in cylinders that are reactivated during the DFSO event where the engine rotates and a portion of engine cylinders do not combust air-fuel mixtures. The TQ sensor outputs a signal that is proportionate to torque output. And, since only one cylinder of a cylinder bank may be combusting air and fuel, the sensor output may be indicative of cylinder air-fuel imbalance for the cylinder combusting air and fuel. Thus, the present approach may increase a signal to noise ratio for determining cylinder air-fuel imbalance. In one example, the torque estimate, TQ (determined using crankshaft acceleration calculated based on crankshaft speed and a time stamp from sensor signal or angular position of crankshaft, and distance travelled by the crankshaft) is learned for every cylinder firing during a cylinder group firing after exhaust valves of the cylinder receiving fuel are opened. The calculated TQ value is expected to correlate to a designated TQ value (e.g., demanded TQ value) determined based on either a difference in quantity of fuel between the first and second pulse or difference in pulse width between the first and second pulse.

Method 1000 begins at 1002 where a cylinder group is selected to later be fired during the open-loop air-fuel ratio control. Selection of the cylinder group may be based on one or more of a firing time and cylinder location, as described above. As one example, with respect to FIG. 3, the cylinders most upstream from an exhaust gas sensor (e.g., sensor 126) may be selected as the cylinder group (e.g., cylinders A1 and B1). Additionally or alternatively, cylinders with corresponding firing times may be selected as the cylinder group (e.g., cylinders A1 and B3). In some examples, the cylinders may combust 360 degrees apart to smooth engine torque production. Consequently, cylinders may be similar in firing time and location. For example, if cylinders A1 and B1 have complementary firing times and are the most upstream cylinders of the exhaust gas sensor. As an example, the cylinder group may comprise at least one cylinder. In some examples, the cylinder group may comprise a plurality of cylinders, further comprising only one cylinder from each cylinder bank. In this way, a number of cylinders in a cylinder group may be equal to a number of cylinder banks, in which each cylinder bank includes only one cylinder combusting air and fuel during an engine cycle (e.g., two revolutions for a four-stroke engine).

After selecting the cylinder group, method 1000 proceeds to 1003 to determine if conditions for fuel injection to the selected cylinder group are met. Conditions for initiating fuel injection may be determined as described in method 1200 of FIG. 12. If the fuel injection conditions are not met, then the method 1000 may proceed to 1004 to continue to monitor fuel injection conditions and determine if fuel injection conditions are met at a later point in time.

If the fuel injection conditions are met, the method 1000 may proceed to 1005 to combust air and fuel in the selected cylinder group (e.g., firing the cylinder group). Firing the selected cylinder group includes injecting two consecutive fuel pulses of different pulse width to only the selected cylinder group while maintaining the remaining cylinders as deactivated (e.g., no fuel injected) while the engine continues to rotate. The fuel pulse width corresponds to an amount of fuel injected to the cylinder. Thus the method 1000 involves each cylinder fueled via consecutive first and second fuel pulses of differing fuel pulse width include each cylinder fueled via a first, larger pulse width followed by a second, smaller pulse width. A first TQ value is determined for the first fuel pulse based on information learned from a first crankshaft acceleration (after injection of the first pulse) from the TQ sensor in 1006. Furthermore, a second TQ value is determined based on information learned from a second crankshaft acceleration (after injection of the second pulse) from the TQ sensor in 1006. A difference in TQ value between the first TQ value and second TQ value is determined and compared to a difference between the first pulse width and the second pulse width in 1008 in order to learn a fuel injector error in 1010.

Figure 11:
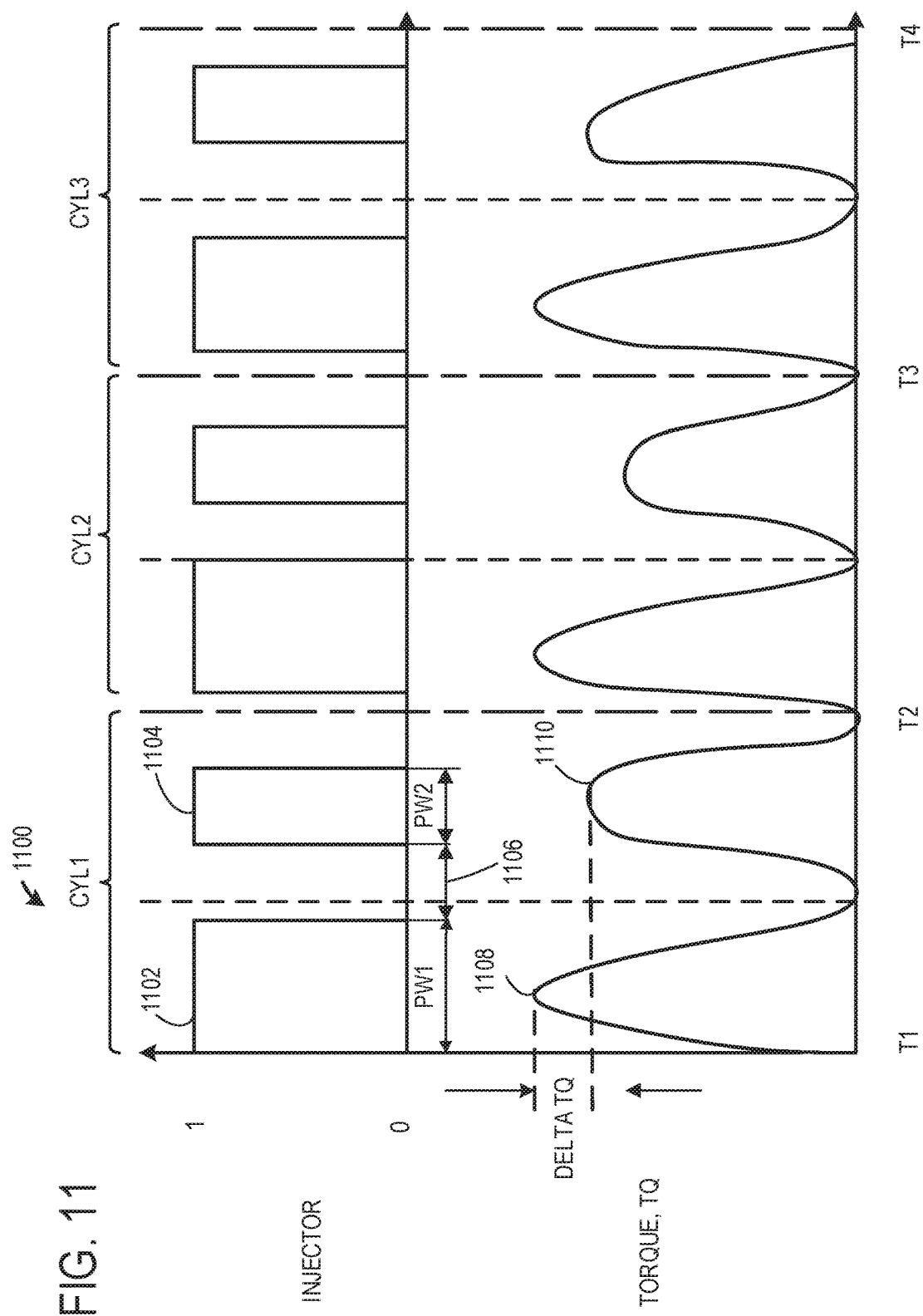
FIG. 11 illustrates sample graphical data measured during open-loop air-fuel ratio control for torque, TQ based cylinder to cylinder air-fuel variation learning.

An example illustrating torque changes after injecting two consecutive fuel pulses in a cylinder group is shown at map 1100 of FIG. 11. Therein, the first plot shows sets of two consecutive fuel pulses of different pulse width injected into a cylinder group. The second plot shows a response in torque production after injection of two consecutive fuel pulses of different pulse width into a cylinder group. On the vertical axis of the first plot, a value of "1" represents a fuel injector injecting fuel (e.g., cylinder firing) and a value of "0"

represents no fuel being injected (e.g., cylinder deactivated). The vertical axis of the second plot represents a torque response, TQ. The horizontal axes of each plot represent time and time increases from the left side of the figure to the right side of the figure. As illustrated, injecting the first set of two consecutive fuel pulses of different pulse width into the first cylinder (CYL1), after T1 and before T2, includes injecting a first fuel pulse 1102 having a larger pulse width, PW1, followed by injecting a second fuel pulse 1104 having a smaller pulse width, PW2. The first fuel pulse width may change the crankshaft acceleration producing a first torque pulse 1108 while the second fuel pulse width may change the crankshaft acceleration producing a second torque pulse 1110 smaller than the first amount. The first and second pulses may also be separated by a given duration, 1106. The duration may correspond to a duration that enables a first change in the torque due to the first pulse to be differentiated from a second change in torque due to the second pulse. In addition, the duration may be adjusted so that each of the first and second fuel pulse is injected over the same combustion event. As such, responsive to the first fuel pulse, the torque pulse may show a perturbation from the first crankshaft acceleration as shown in 1108. Responsive to the second fuel pulse, the torque pulse may result in a second perturbation 1110, a different amount from the first torque perturbation. The torque pulse from the first fuel pulse is defined herein as TQ1. Further, the torque pulse from the second fuel pulse is defined herein as TQ2. As elaborated herein, based on the relative change in TQ, the engine controller may learn an error for the given injector. In particular, by comparing the actual change in TQ for the two pulses, delta TQ to an expected change in TQ, wherein the expected change in TQ is based on either a difference between the first and second pulse width or difference in quantity of fuel between the first and second pulse, the controller may learn the injector error. The difference between a measured delta TQ (difference in TQ values from the first and second pulse) and the expected TQ is hereafter defined as the relative TQ variation. Further, since the error is learned based on the difference between the expected TQ and delta TQ, the injector error can be learned independent of an air-fuel ratio error contribution from PCV or purge gases. Alternatively, the above analysis may be performed using more than a single set of fuel pulses, as an example a second set of two consecutive fuel pulses may be injected into a cylinder of cylinder group and learning the injector error.

Returning to the method 1000, the two pulses injected into the selected group of cylinders may be fired one or more times to produce a selected crankshaft acceleration perturbation after each combustion event in the reactivated cylinder. For example, the two consecutive pulses may be fired twice for each cylinder. Fuel is injected into the cylinder before the cylinder fires. For example, if the selected cylinder group comprises cylinders A1 and B1, then both cylinder A1 and cylinder B1 fire. Firing cylinder A1 produces an acceleration perturbation in the crankshaft sensed via the TQ sensor after the combusted mixture in cylinder A1 is expelled to the exhaust system and a perturbation in the torque is generated. Firing cylinder B1 produces an acceleration perturbation in the crankshaft sensed via the same TQ sensor after the combusted mixture in cylinder B1 and a perturbation in the torque is generated. As mentioned above, a selected cylinder(s) may combust air and fuel over one or more engine cycles while other cylinders remain deactivated and not receiving fuel.

The fuel injection may also include determining an amount of fuel to be injected in each of the two consecutive pulses, in which the total amount of fuel injected into the cylinder over the firing event may be less than a threshold injection. The threshold injection may be based on a drivability, in which injecting an amount of fuel greater than the threshold injection may reduce drivability. In addition to determining a total amount of fuel that is delivered over the two pulses, a relative amount of fuel to be injected in each fuel pulse may be determined so that a higher than threshold difference in air-fuel ratio is achieved following the pulses. In other words, the first pulse width and the second pulse width may be selected such that a difference between the first and second pulse width is higher than a threshold.

At 1006, the method 1000 determines a TQ value corresponding to each of the two consecutive fuel pulses each time a perturbation in the crankshaft is generated. As used herein, determining a TQ value includes determining perturbation in crankshaft acceleration using information from a TQ sensor. Thus the TQ value for the first pulse is determined based on information from the first crankshaft acceleration after injection of the first fuel pulse. The TQ value may be correlated to the amount of fuel injected to the cylinder, and the amount of fuel injected to the cylinder may be based on a fuel pulse width applied to a fuel injector of the cylinder receiving fuel. The fuel pulse width corresponds to an amount of fuel injected to the cylinder. As one example, if both cylinders A1 and B1 are fired 10 times during the cylinder group firing, then 10 separate TQ values may be determined for each of the two consecutive pulses into cylinder A1 and cylinder B1. Method 1000 proceeds to 1008 after TQ values are determined.

At 1008, a difference in torque production for the two consecutive pulses is compared to a corresponding difference between the first and second pulse widths of the two consecutive pulses. In other words, a first TQ for the first pulse is compared to a second TQ for the second pulse. As an example, the first pulse may have a first pulse width PW1 which corresponds to a first amount of injected fuel mf1 and the first pulse may generate a first TQ value, TQ1. Likewise, the second pulse may have a second pulse width PW2 which corresponds to a second amount of injected fuel mf2 and the second pulse may generate a second TQ value, TQ2. The controller may compare the difference in fuel pulse widths (PW1-PW2), or the difference in fuel injection amounts (mf1-mf2) to the corresponding change in torque (TQ1-TQ2).

At 1010, an injector error is learned based on the comparison. Specifically, assuming purge or PCV flow remains constant during the DFSO, the injector error is learned based on the difference between the first and second TQ value relative to a corresponding difference between the first and second fuel injection amounts (or first and second pulse-widths), independent of any purge or PCV contribution.

Alternatively or additionally, following the injection of two consecutive fuel pulses of different pulse width to a cylinder group, a mathematical expression may be developed relating crankshaft perturbation to quantity of fuel injected, amount of fuel vapor purged and fuel injector error, as shown in Equation 3. The term $TQ_n$ is the mean torque production over one or multiple engine cycles, mfn is quantity of fuel injected in the cylinder for the nth fuel pulse, mfp is quantity of fuel vapor purged from the system and kc is coefficient of deviation of a fuel injector.

$$TQ_n = kc*mfn + mfp \qquad \text{Equation 3}$$

Assuming that the quantity of air charge and fuel vapor purged from system remains constant during the injector error learning (since a duration of the learning routine tends to be short), a relationship may be developed relating the deviation of a particular fuel injector in respect to commanded fuel quantity. In this example, two fuel pulses of different widths are delivered consecutively to the cylinder group and combusted, and resulting exhaust gas oxygen concentration corresponding to the different fuel pulses are determined. Subsequently, a system of equations may be developed (based on Equation 3), and solved to learn the deviation of a particular fuel injector with respect to commanded fuel quantity, kc as shown in Equation 4.

$$kc = \frac{TQ1 - TQ2}{mf1 - mf2} \qquad \text{Equation 4}$$

Since purge and PCV errors are assumed to be constant after injection of the first and second fuel pulse of different pulse width, differencing the TQ value of the two pulses results in cancellation of purge and PCV induced error. Thus, the fuel injector error learned is independent of deviations in air-fuel ratio related to purge and PCV fuel vapors.

A cylinder to cylinder air-fuel imbalance may result from the relative change in the torque production following the two consecutive fuel pulses of differing pulse width deviating from a desired or expected change in torque production, where the expected change in torque production is based on the difference in fuel pulse widths between the first and second fuel pulses. Herein, cylinder TQ variation is not determined based on comparing one or an average of TQ values of each pulse against an expected TQ value for that pulse because such a calculation would not accurately account for deviations in torque production contributed by purge or PCV fuel vapors.

In one example, a first TQ value for the first amount of fuel injected in the first pulse into the selected cylinder (e.g., 2.0λ) may be determined. Likewise, a second TQ value for the second amount of fuel injected in the second pulse into the selected cylinder (e.g., 1.5λ) may be determined. The first of ten TQ values corresponding to the first pulse in cylinder A1 may be determined (herein of 2.0λ) for the first pulse into cylinder A1 for the present DFSO event. Likewise, the first of ten crankshaft velocity values for corresponding to the second pulse in cylinder A1 may be determined (herein of 1.5λ) for the second pulse into cylinder A1 for the present DFSO event. The relative difference is then determined as 2.0−1.5=0.5λ. In the present example, the difference in fuel injection amount for the first and second fuel pulses (mf1-mf2) may, however, correspond to an expected relative difference of 0.8λ. The relative TQ variation for the present DFSO event is then determined by subtracting the actual TQ difference from the expected difference, and if the result is greater than a threshold, it may be determined that cylinder A1 exhibits air-fuel imbalance from other cylinders because its own change in torque production does not match its expected change in torque production. Alternatively, an average of the ten TQ values for the first and second pulses of cylinder A1 are learned to determine a first average and second average TQ values for the first and second pulses, respectively, to the cylinder A1 for the present DFSO event. If a difference between the average TQ (determined from the difference of the first average and second average TQ values) for the present DFSO event is then subtracted from the expected TQ average value (based on the first and second pulse widths), and if the result is greater than a threshold, it may be determined that cylinder A1 exhibits imbalance from other cylinders. The controller may inject more or less fuel during future cylinder combustions based on a magnitude of error between the expected TQ difference value and the actual/average TQ difference value. Thus method 1000 during a deceleration fuel shut-off (DFSO) condition, with purge enabled, involves injecting consecutive first and second fuel pulses of differing pulse width from an injector into a cylinder and learning an error for the injector based on an actual change in torque between the first and second pulses relative to an expected change in torque; and adjusting fueling from the injector based on the learned error following termination of the DFSO condition.

In another example, the expected value may be a predetermined single value that the TQ difference from the first and second fuel pulse of cylinder A1 are compared against. For example, if a single expected TQ value is equal to 0.3, but a cylinder combustion TQ from the first fuel pulse is 1.9 on a given combustion event and 1.4 from the second fuel pulse of the given combustion event, the TQ variation determined at 1006 is 0.5, and a rich air-fuel ratio TQ variation may be determined. Alternatively, the single expected TQ value may be compared to the average of the difference of ten TQ values of the first and second fuel pulses for cylinder A1. The predetermined single expected value may be based on the difference in amount of fuel injected to cylinder A1 for combustion from the first and second fuel pulse, (mf1-mf2). The controller may inject more or less fuel during future cylinder combustions based on a magnitude of difference between the predetermined single TQ variation and the TQ variation determined at 1006.

In yet another example, the expected value may be a range of TQ values (e.g., 2.0λ-1.8λ). One or an average of the ten TQ values samples corresponding to the difference between the first and second fuel pulse TQ samples from cylinder A1 may be compared to the expected value range. If the one or average of TQ value samples is in the expected range, no imbalance is detected. However, if the one or average of TQ values samples is outside of the expected range, it may be determined that there is a cylinder TQ imbalance. Similar analysis with regard to cylinder B1 and other cylinders may be provided. The controller may inject more or less fuel during future cylinder combustions based on a magnitude of difference between the range of expected TQ values and the measured TQ value determined at 1006. For example, if the expected value is a range between 2.0λ and 1.8λ, but the measured TQ value between the first and second pulse determined at 1006 is 2.1λ, additional fuel may be injected to the cylinder because the TQ value of 2.1 is leaner than expected. The leaner TQ value is compensated by increasing the base amount of fuel injected to the cylinder by a factor based on the TQ error of 0.1.

If the one or average of the difference in TQ values from first and second fuel pulses from cylinder combustion is compared to the expected value and TQ variation is exhibited, the answer is yes and method 1000 proceeds to 1010. Otherwise, the answer is no and method 1000 proceeds to 1012.

It should also be noted that if a transmission shift request is made during the time fuel is injected to the reactivated cylinders, injection of fuel ceases until the shift is complete. If a transmission shift request occurs between injections in different cylinders, injection of fuel and TQ variation analysis is delayed until the shift is complete. By not performing TQ analysis and fuel injection during the transmission shift, the possibility of inducing TQ variation may be reduced.

At 1012, the method 1000 judges if TQ values and TQ variations have been determined for all cylinders. If TQ values/variations of all cylinders have not been assessed and do not have one or more TQ values associated with the cylinders, then the answer is no and method 1000 proceed to 1013. Otherwise, the answer is yes and method 1000 proceeds to 1016.

At 1013, method 1000 judges whether or not DFSO conditions are met or present. A driver may apply an accelerator pedal or engine speed may fall to a speed less than desired so that DFSO conditions are not met. If DFSO conditions are not met, the answer is no and method 1000 proceeds to 1014. Otherwise, the answer is yes and method 1000 proceeds to 1015.

At 1014, method 1000 exits DFSO and returns to closed-loop air-fuel control. Cylinders are reactivated via supplying spark and fuel to the deactivated cylinders. In this way, the open-loop air-fuel ratio control is also disabled despite not having acquired TQ values for all cylinders of the engine. In some examples, if an open-loop air-fuel ratio control is disabled prematurely, then the controller may store any TQ values measured for a selected cylinder group(s) and consequently, select a different cylinder group(s) initially during the next open-loop air-fuel ratio control. Thus, if TQ values are not acquired for a cylinder group during an open-loop air-fuel ratio control, the cylinder group may be the first cylinder group for which TQ values are determined for establishing the presence or absence of imbalance during a subsequent DFSO event. The method 1000 proceeds to exit after engine returns to closed-loop air-fuel control.

At 1015, method 1000 selects a next cylinder group for determining TQ values for establishing the presence or absence of imbalance. Selecting the next cylinder group may include selecting different cylinders other than the cylinders selected in the preceding cylinder group. For example, cylinders A3 and B3 may be selected instead of A1 and B1. Additionally or alternatively, the method 1000 may select cylinder groups sequentially along a cylinder bank. For example, cylinders A2 and B3 may comprise a cylinder group after firing cylinders A1 and B1 of a selected cylinder group. Method 1000 returns to 1003 to reactivate the selected cylinder group, as described above.

At 1016, method 1000 deactivates open-loop air-fuel ratio control including terminating cylinder activation and selection of cylinder groups. Therefore, method 1000 returns to nominal DFSO where all cylinders are deactivated and where cylinder imbalance is not determined. Method 1000 proceeds to 1018 after the engine renters nominal DFSO.

At 1018, method 1000 judges whether or not DFSO conditions are met. If the answer is no, method 1000 proceeds to 1020. Otherwise, the answer is yes and method 1000 returns to 1018. DFSO conditions may no longer be met if engine speed is reduced to less than a threshold or if the accelerator pedal is applied.

At 1020, the method 1000 exits DFSO and reactivates all cylinders in closed-loop fuel control. The cylinders may be reactivated according to the firing order of the engine. Method 1000 proceeds to 1022 after engine cylinders are reactivated.

At 1022, method 1000 adjusts cylinder operation of any cylinders exhibiting TQ variation as determined at 608. The adjusting may include adjusting amounts of fuel injected to engine cylinders via adjusting fuel injection timing, such as by advancing or retarding fuel injection timing. The fuel injection timing adjustments may be proportional to the TQ variation between the first and second fuel pulse as described at 1008. For example, if the expected TQ variation is 3.8 and the measured TQ variation between the first and second fuel pulse is 4.0, then the error magnitude may be equal to 0.2, indicating a rich air-fuel ratio deviation in the particular cylinder. The adjusting may further include injecting a greater amount of fuel or a lesser amount of fuel based on the type of TQ variation error. For example, if one cylinder indicates rich TQ variation or error, then the adjustments may include one or more of injecting less fuel and providing more air to the cylinder. The method 1000 may exit after applying the adjustments corresponding to the learned TQ errors for each cylinder.

Thus, the method of FIG. 10 provides for a method, comprising: during a deceleration fuel shut-off (DFSO) event, sequentially firing cylinders of a cylinder group, each cylinder fueled via consecutive first and second fuel pulses of differing fuel pulse width from an injector; and based on a deviation in crankshaft acceleration between the first and second pulses, learning a fuel error for the injector and an air-fuel ratio imbalance for each cylinder. The method further comprises adjusting subsequent engine operation based on the indicated air-fuel ratio variation. The method includes wherein the cylinder group is selected based on one or more of a firing order and a cylinder position within the firing order. The method includes wherein fueling of the cylinder group upon which the indication of air-fuel imbalance is based occurs only after the initial crankshaft acceleration is measured during the DFSO.

Figure 12:
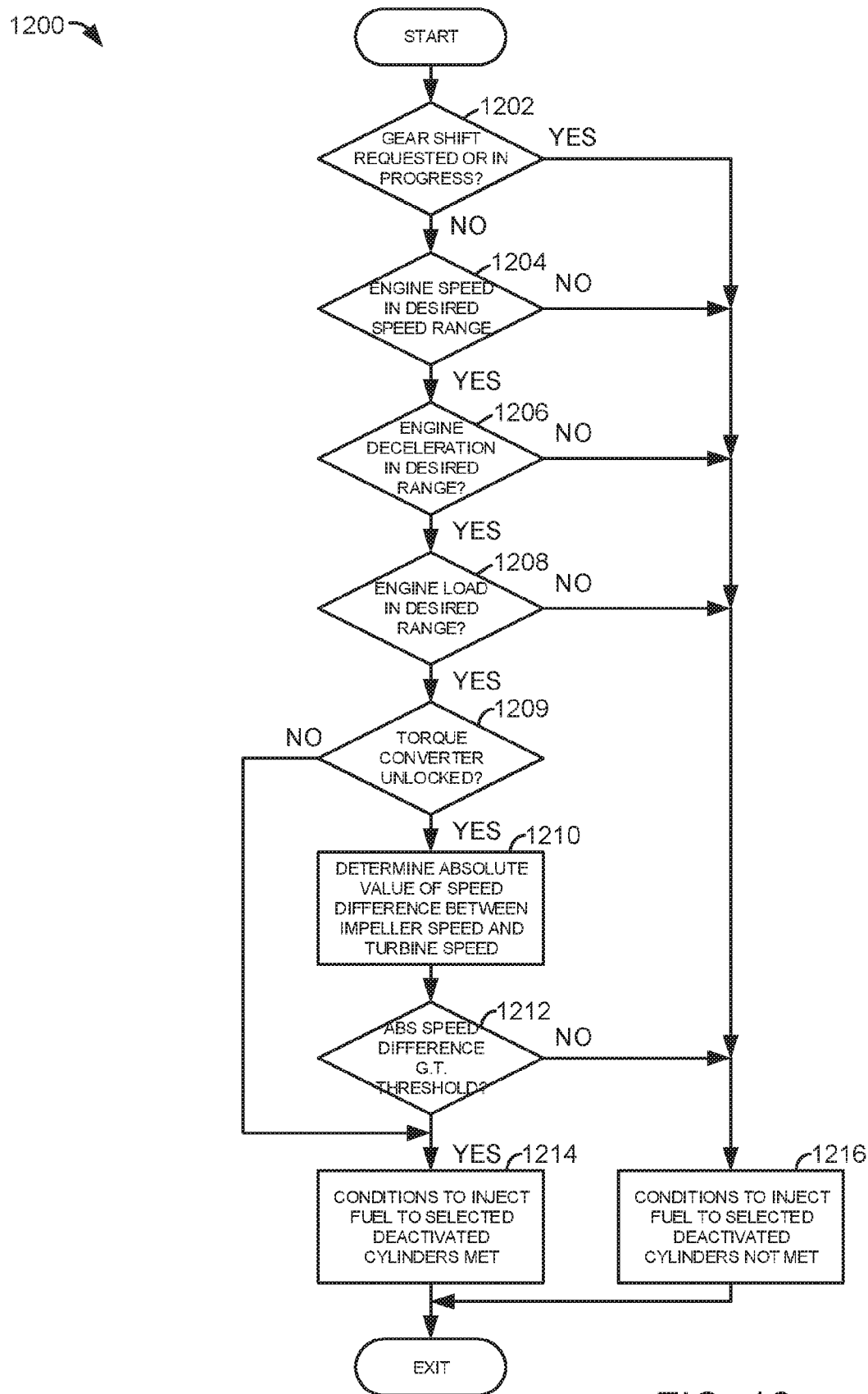
FIG. 12 is a high level flowchart of an example method for determining if fuel injection is to be activated in selected cylinders to determine cylinder air-fuel ratio imbalance.

Referring now to FIG. 12, a method for judging whether or not to supply fuel to reactivate deactivated cylinders for the purpose of determining cylinder imbalance is shown. The method of FIG. 12 may be applied in conjunction with the method if FIG. 4-6 to provide the sequences shown in FIG. 8-9. Alternatively, the method of FIG. 12 may be the basis for when samples of exhaust gases may be included for determining cylinder air-fuel imbalance.

At 1202, method 1200 judges whether or not a request to shift transmission gears is present or if a transmission gear shift is in progress. In one example, method 1200 may determine a shift is requested or in progress based on a value of a variable in memory. The variable may change state based on vehicle speed and driver demand torque. If method 1200 judges that a transmission gear shift is requested or in progress, the answer is yes and method 1200 proceeds to 1216. Otherwise, the answer is no and method 1200 proceeds to 1204. By not injecting fuel to deactivated cylinders during transmission gear shifts, air-fuel ratio variation may be reduced to improve the air-fuel signal to noise ratio.

At 1204, method 1200 judges whether or not a request engine speed is within a desired speed range (e.g., 1000-3500 RPM). In one example, method 1200 may determine engine speed from an engine position or speed sensor. If method 1200 judges that the engine speed is within a desired range, the answer is yes and method 1200 proceeds to 1206. Otherwise, the answer is no and method 1200 proceeds to 1216. By not injecting fuel to deactivated cylinders when engine speed is out of range, air-fuel ratio variation may be reduced to improve the air-fuel signal to noise ratio.

At 1206, method 1200 judges whether or not a request engine deceleration is within a desired range (e.g., less than 300 RPM/sec.). In one example, method 1200 may determine engine deceleration from the engine position or speed sensor. If method 1200 judges that the engine deceleration is within a desired range, the answer is yes and method 1200 proceeds to 1208. Otherwise, the answer is no and method 1200 proceeds to 1216. By not injecting fuel to deactivated cylinders when engine deceleration rate is out of range, air-fuel ratio variation may be reduced to improve the air-fuel signal to noise ratio.

At 1208, method 1200 judges whether or not engine load is within a desired range (e.g., between 0.1 and 0.6). In one example, method 1200 may determine engine load from an intake manifold pressure sensor or a mass air flow sensor. If method 1200 judges that the engine load is within a desired range, the answer is yes and method 1200 proceeds to 1209. Otherwise, the answer is no and method 1200 proceeds to 1216. By not injecting fuel to deactivated cylinders when engine load is out of range, air-fuel ratio variation may be reduced to improve the air-fuel signal to noise ratio.

At 1209, method 1200 judges whether or not the torque converter clutch is open and the torque converter is unlocked. If the torque converter is unlocked, the torque converter turbine and impeller may rotate at different speeds. The torque converter impeller and turbine speeds may be indicative of whether or not the driveline is passing through or being at a zero torque point. However, if the torque converter clutch is locked, the indication of the zero torque point may be less clear. The torque converter clutch state may be sensed or a bit in memory may indicate whether or not the torque converter clutch is open. If the torque converter clutch is unlocked, the answer is yes and method 1200 proceeds to 1210. Otherwise, the answer is no and method 1200 proceeds to 1214. Thus, in some examples, the torque converter clutch may be commanded open to unlock the torque converter when the determination of cylinder air-fuel ratio imbalance is desired.

At 1210, method 1200 determines an absolute value of a difference between torque converter impeller speed and torque converter turbine speed. The speed difference may be indicative of the engine transitioning through a zero torque point where engine torque is equivalent to driveline torque. During vehicle deceleration, engine torque may be reduced and vehicle inertia may transfer a negative torque from vehicle wheels into the vehicle driveline. Consequently, a space between vehicle gears referred to gear lash may increase to where the gears briefly fail to positively engage, and then the gears engage on an opposite side of the gears. The condition where there is a gap between gear teeth (e.g., gear teeth are not positively engaged) is the zero torque point. The increase in gear lash and subsequent reengagement of gear teeth may cause driveline torque disturbances which may induce cylinder air amount changes that may result in air-fuel ratio variation. Therefore, it may be desirable to not inject fuel to select cylinders at the zero torque point during DFSO to reduce the possibility of skewing air-fuel ratio imbalance determination. Torque converter impeller speed being within a threshold speed of torque converter turbine speed (e.g., within ±25 RPM) may be indicative of being at or passing through the zero torque point where space between gears increases or lash develops. Therefore, fuel injection may be ceased until the driveline transitions through the zero torque point to avoid the possibility of inducing air-fuel ratio imbalance determination errors. Alternatively, fuel injection may not be started until after the driveline passes through the zero torque point and gear teeth reengage during DFSO. Method 1200 proceeds to 1212 after the absolute value of the difference in turbine speed and impeller speed is determined.

At 1212, method 1200 judges if the absolute value of the difference in torque converter impeller speed and torque converter turbine speed is greater than a threshold (e.g., 50 RPM). If so, the answer is yes and method 1200 proceeds to 1214. Otherwise, the answer is no and method 1200 proceeds to 1216.

At 1214, method 1200 indicates that conditions for activating fuel injection to selected engine cylinders during DFSO to determine cylinder air-fuel imbalance are met. Consequently, one or more deactivated engine cylinders may be reactivated by injecting fuel into the select cylinders and combusting the fuel. Method 1200 indicates to the method of FIGS. 4-6 that conditions for injecting fuel to select deactivated cylinders during DFSO are present and exits.

Alternatively at 1214, method 1200 indicates that conditions for applying or using exhaust air-fuel or lambda samples to determine cylinder air-fuel imbalance are met. Therefore, exhaust samples may be included to determine a lambda variation for cylinders reactivated during DFSO.

At 1216, method 1200 indicates that conditions for activating fuel injection to selected engine cylinders during DFSO to determine cylinder air-fuel imbalance are not met. Consequently, one or more deactivated engine cylinders continue to be deactivated until conditions for injecting fuel to deactivated cylinders are present. Additionally, it should be noted that fueling of one or more cylinders may be stopped and then restarted in response to conditions for injecting fuel changing from being present to not being present then later being present. In some examples, analysis for cylinder imbalance starts over for cylinders receiving fuel so that the cylinder's lambda variation is not based on lambda analysis before and after conditions where fuel is not injected. Method 1200 indicates to the method of FIGS. 4-6 that conditions for injecting fuel to select deactivated cylinders during DFSO are not present and exits.

Alternatively at 1216, method 1200 indicates that conditions for applying or using exhaust air-fuel or lambda samples to determine cylinder air-fuel imbalance are not met. Therefore, exhaust samples may not be included to determine lambda variation for cylinders reactivated during DFSO.

In this way, the open-loop air-fuel ratio control may be more consistent (e.g., replicated) from a first selected cylinder group to a second selected cylinder group. It will be appreciated by one skilled in the art that other suitable conditions and combinations thereof may be applied to begin fuel injection to cylinders deactivated during the DFSO event. For example, fuel injection may begin a predetermined amount of time after an exhaust air-fuel ratio is leaner than a threshold air-fuel ratio.

In some examples, the method includes wherein adjusting subsequent engine operation includes adjusting a fuel injector pulse width based on the learned fuel error and the air-fuel ratio imbalance following termination of the DFSO. The method includes wherein an expected air-fuel ratio deviation is based on the difference in fuel pulse width between the first and second fuel pulses. The method includes wherein adjusting subsequent engine operation includes adjusting subsequent fuel injections to a cylinder based on the indicated crankshaft acceleration variation following termination of the DFSO. The method includes wherein the cylinder group is fueled and operated to perform a combustion cycle a plurality of times during the DFSO producing a plurality of air-fuel ratio responses that are together used to identify the imbalance.

In this way, the method and system described herein reduces discrepancies in injector error learning caused by the presence of purge and PCV gases. The technical effect of enabling learning of a fuel injector error and air-ratio imbalance in cylinder groups, for engines with dual fuel injection systems configured with hardware for direct and port fuel injection, using two consecutive pulses of differing pulse width is that the effect of fuel purged to engine can be accounted for. Thus fuel injector error and air-ratio imbalances in cylinder groups can be learned without requiring purge and PCV to be disabled. As such this improves the window where injector learning can be performed. Also, the approach enables correction of fuel injector error and air-ratio imbalances in cylinder groups leading to improved fuel efficiency and reduced exhaust emissions.

One example method comprises, during a deceleration fuel shut-off (DFSO) event where all cylinders of an engine are deactivated, sequentially firing each cylinder of a cylinder group, each cylinder fueled via consecutive first and second fuel pulses of differing fuel pulse width from an injector; and based on a lambda deviation between the first and second pulses, learning a fuel error for the injector and an air-fuel ratio imbalance for each cylinder. The preceding example may additionally or optionally further comprise, based on a difference in crankshaft acceleration between the first and second pulses, learning a torque error for each cylinder. Any or all of the preceding examples may additionally or optionally further comprise, adjusting subsequent engine operation based on one or more of each of the learned fuel error, air-fuel ratio imbalance, and torque error. In any or all of the preceding examples, additionally or optionally the adjusting includes adjusting a fuel injector pulse width for the injector based on the learned fuel error and the air-fuel ratio imbalance following termination of the DFSO. Any or all of the preceding examples may additionally or optionally further comprise each cylinder fueled via consecutive first and second fuel pulses of differing fuel pulse width include each cylinder fueled via a first, larger pulse width followed by a second, smaller pulse width, a difference between the first pulse width and the second pulse width adjusted to be higher than a threshold. The preceding example may additionally or optionally further comprise each of the consecutive first and second fuel pulses are injected on a common combustion cycle. In any or all of the preceding examples additionally or optionally, a duration elapsed between the consecutive first and the second fuel pulses is based on one or more of engine speed and a response time of an exhaust gas oxygen sensor.

In another preceding example, each cylinder includes a port injector and a direct injector and wherein each cylinder fueled via consecutive first and second fuel pulses of differing fuel pulse width from an injector includes each cylinder fueled via consecutive first and second pulses of differing pulse width from one of the port injector and the direct injector on a first cylinder event, and then the cylinder fueled via consecutive first and second pulses of differing pulse width from the other of the port injector and the direct injector on a second, subsequent cylinder event of the cylinder. The preceding example may additionally or optionally further comprise learning based on a difference in lambda deviation between the first and second pulses includes learning a first lambda following the first pulse, learning a second lambda following the second pulse, determining an actual lambda deviation based on a difference between the first lambda and the second lambda, comparing the actual lambda deviation to an expected lambda deviation based on a difference between the first and second pulse widths, and determining the difference in lambda deviation based on the actual lambda deviation relative to the expected lambda deviation. Any or all of the preceding examples may additionally or optionally further comprise the first lambda is based on a first air-fuel ratio deviation for each cylinder from a maximum lean air-fuel ratio during the DFSO following the first pulse, and wherein the second lambda is based on a second air-fuel ratio deviation for each cylinder from the maximum lean air-fuel ratio during the DFSO following the second pulse. The preceding example may additionally or optionally further comprise one or more of purge and/positive crankcase ventilation are enabled during the DFSO, and wherein the cylinder group is selected based on one or more of a firing order and a cylinder position within the firing order.

In another representation, a method for an engine includes, with all engine cylinders disabled and purge enabled, injecting consecutive first and second fuel pulses of differing pulse width from an injector into a cylinder; learning an error for the injector based on an actual change in lambda between the first and second pulses relative to an expected change in lambda; and adjusting fueling from the injector based on the learned error following termination of the DFSO condition. The preceding example may additionally or optionally further comprise the actual change in lambda is based on a perturbation in exhaust air-fuel ratio from a maximum lean air-fuel ratio for the DFSO condition, and wherein the expected change in lambda is based on the first pulse width relative to the second pulse width. Any or all of the preceding examples may additionally or optionally further comprise the injector is a first injector of the cylinder and wherein the injecting is performed on a first cylinder event and wherein the learned error is a first error for the first injector, the cylinder further including a second injector, the method further comprising, during a second cylinder event of the cylinder during the DFSO condition, injecting consecutive the first and second fuel pulses of the first and second pulse widths, respectively, from the second injector into the cylinder, and learning a second error for the second injector based on the actual change in lambda between the first and second pulses relative to the expected change in lambda in the second cylinder. The preceding example may additionally or optionally further comprise adjusting the fueling includes adjusting a split ratio of fuel delivered to the cylinder from the first injector relative to the second injector based on the first error relative to the second error.

In another example, a method for an engine operating at a maximum lean air-fuel ratio with all cylinders disabled; selectively enabling an injector of a cylinder; injecting each of a first, longer and a second, shorter fuel pulse from the injector into the cylinder; learning a first air-fuel ratio deviation from the maximum lean air-fuel ratio following the first pulse and a second air-fuel ratio deviation from the maximum lean air-fuel ratio following the second pulse; and learning an injector error based on an actual difference between the first deviation and the second deviation relative to an expected difference. The preceding example may additionally or optionally further comprise the first, longer pulse has a first pulse-width and the second shorter pulse has a second pulse-width, and wherein the expected difference is based on the first pulse width relative to the second pulse width. Any or all of the preceding examples may additionally or optionally further comprise learning a first torque deviation based on a first change in engine speed following the first pulse; learning a second torque deviation based on a second change in engine speed following the second pulse; and learning a cylinder torque imbalance based on an actual difference between the first and second torque deviation relative to an expected difference in torque deviation. Furthermore, the preceding example may additionally or optionally further comprise when operating with all cylinders enabled, adjusting fueling from the injector based on each of the learned injector error and the learned cylinder torque imbalance, adjusting fueling including one or more of adjusting a fuel injection timing, a fuel injection amount, and a number of injections from the injector on a given cylinder event.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
during a deceleration fuel shut-off (DFSO) event where all cylinders of an engine are deactivated, sequentially firing each cylinder of a cylinder group to combust fuel, the fuel provided to each cylinder via consecutive first and second fuel pulses of differing fuel pulse widths from an injector; and
based on a lambda deviation between the first and second fuel pulses, learning a fuel error for the injector and an air-fuel ratio imbalance for each cylinder.

2. The method of claim 1, further comprising, based on a difference in crankshaft acceleration between the first and second fuel pulses, learning a torque error for each cylinder.

3. The method of claim 2, further comprising adjusting subsequent engine operation based on one or more of or each of the learned fuel error, the air-fuel ratio imbalance, and the torque error.

4. The method of claim 3, wherein the adjusting includes adjusting a fuel injector pulse width for the injector based on the learned fuel error and the air-fuel ratio imbalance following termination of the DFSO.

5. The method of claim 1, wherein each cylinder fueled via the consecutive first and second fuel pulses of differing fuel pulse widths includes each cylinder fueled via a first, larger pulse width followed by a second, smaller pulse width, a difference between the first pulse width and the second pulse width adjusted to be higher than a threshold.

6. The method of claim 1, wherein each of the consecutive first and second fuel pulses is injected over a same combustion event.

7. The method of claim 1, wherein a duration elapsed between the consecutive first and second fuel pulses is based on one or more of an engine speed and a response time of an exhaust gas oxygen sensor.

8. The method of claim 1, wherein each cylinder includes a port injector and a direct injector and wherein each cylinder fueled via the consecutive first and second fuel pulses of differing fuel pulse widths from the injector includes each cylinder fueled via consecutive first and second fuel pulses of differing pulse widths from one of the port injector and the direct injector on a first cylinder event, and then each cylinder fueled via the consecutive first and second fuel pulses of differing pulse widths from the other of the port injector and the direct injector on a second, subsequent cylinder event of the cylinder.

9. The method of claim 1, wherein the learning based on the difference in lambda deviation between the first and second fuel pulses includes learning a first lambda following the first fuel pulse, learning a second lambda following the second fuel pulse, determining an actual lambda deviation based on a difference between the first lambda and the second lambda, comparing the actual lambda deviation to an expected lambda deviation based on a difference between first and second pulse widths, and determining the difference in lambda deviation based on the actual lambda deviation relative to the expected lambda deviation.

10. The method of claim 9, wherein the first lambda is based on a first air-fuel ratio deviation for each cylinder from a maximum lean air-fuel ratio during the DFSO following the first fuel pulse, and wherein the second lambda is based on a second air-fuel ratio deviation for each cylinder from the maximum lean air-fuel ratio during the DFSO following the second fuel pulse.

11. The method of claim 1, wherein one or more of purge and/or positive crankcase ventilation are enabled during the DFSO, and wherein the cylinder group is selected based on one or more of a firing order and a cylinder position within the firing order.

12. An engine method, comprising:
during a deceleration fuel shut-off (DFSO) condition, with purge enabled,
injecting and combusting consecutive first and second fuel pulses of differing pulse widths, the consecutive first and second fuel pulses injected from an injector into a cylinder;

learning an error for the injector based on an actual change in lambda between the first and second fuel pulses relative to an expected change in lambda, the change between a minimum reading and a reading immediately adjacent the minimum reading; and adjusting fueling from the injector based on the learned error following termination of the DFSO condition.

13. The method of claim 12, wherein the consecutive first and second fuel pulses include the first fuel pulse with a first, larger pulse width followed by a second fuel pulse with the second, smaller pulse width, a difference between the first pulse width and the second pulse width adjusted to be higher than a threshold, the first fuel pulse separated from the second fuel pulse by a duration.

14. The method of claim 13, wherein the actual change in lambda is based on a perturbation in exhaust air-fuel ratio from a maximum lean air-fuel ratio for the DFSO condition, and wherein the expected change in lambda is based on the first pulse width relative to the second pulse width.

15. The method of claim 14, wherein the injector is a first injector of the cylinder and wherein the injecting is performed on a first cylinder event and wherein the learned error is a first error for the first injector, the cylinder further including a second injector, the method further comprising, during a second cylinder event of the cylinder during the DFSO condition, injecting the consecutive first and second fuel pulses of the first and second pulse widths, respectively, from the second injector into the cylinder, and learning a second error for the second injector based on the actual change in lambda between the first and second fuel pulses relative to the expected change in lambda in the second cylinder.

16. The method of claim 15, wherein adjusting the fueling includes adjusting a split ratio of fuel delivered to the cylinder from the first injector relative to the second injector based on the first error relative to the second error.

17. A method for an engine, comprising:
while operating an engine at a maximum lean air-fuel ratio with all cylinders disabled,
selectively enabling an injector of a cylinder;
injecting and combusting each of a first, longer fuel pulse and a second, shorter fuel pulse from the injector into the cylinder;
learning a first air-fuel ratio deviation from a maximum lean air-fuel ratio following the first fuel pulse and a second air-fuel ratio deviation from the maximum lean air-fuel ratio following the second fuel pulse; and
learning an injector error based on an actual difference between the first deviation and the second deviation relative to an expected difference.

18. The method of claim 17, wherein the first, longer pulse has a first pulse width and the second shorter pulse has a second pulse width, and wherein the expected difference is based on the first pulse width relative to the second pulse width.

19. The method of claim 17, further comprising:
learning a first torque deviation based on a first change in engine speed following the first fuel pulse;
learning a second torque deviation based on a second change in engine speed following the second fuel pulse; and
learning a cylinder torque imbalance based on an actual difference between the first and second torque deviations relative to an expected difference in torque deviation.

20. The method of claim 19, further comprising:
when operating with all cylinders enabled,
adjusting fueling from the injector based on each of the learned injector error and the learned cylinder torque imbalance, the adjusting fueling including one or more of adjusting a fuel injection timing, a fuel injection amount, and a number of injections from the injector on a given cylinder event.

* * * * *